US009861972B1

(12) United States Patent
Rana et al.

(10) Patent No.: US 9,861,972 B1
(45) Date of Patent: Jan. 9, 2018

(54) HYDRODEMETALLIZATION CATALYSTS

(71) Applicant: KUWAIT INSTITUTE FOR SCIENTIFIC RESEARCH, Safat (KW)

(72) Inventors: Mohan Singh Rana, Kuwait (KW); Faisal S. Alhumaidan, Kuwait (KW)

(73) Assignee: KUWAIT INSTITUTE FOR SCIENTIFIC RESEARCH, Safat (KW)

( * ) Notice: Subject to any disclaimer, the term of this patent is extended or adjusted under 35 U.S.C. 154(b) by 0 days.

(21) Appl. No.: 15/479,260

(22) Filed: Apr. 4, 2017

(51) Int. Cl.
| | |
|---|---|
| *B01J 23/76* | (2006.01) |
| *B01J 23/85* | (2006.01) |
| *B01J 35/00* | (2006.01) |
| *B01J 35/10* | (2006.01) |
| *B01J 37/00* | (2006.01) |
| *C10G 45/02* | (2006.01) |
| *C10G 45/04* | (2006.01) |
| *B01J 31/26* | (2006.01) |
| *B01J 23/881* | (2006.01) |
| *B01J 23/882* | (2006.01) |
| *B01J 23/883* | (2006.01) |
| *B01J 21/18* | (2006.01) |
| *B01J 21/04* | (2006.01) |
| *B01J 31/04* | (2006.01) |
| *B01J 37/04* | (2006.01) |
| *B01J 37/08* | (2006.01) |
| *B01J 37/02* | (2006.01) |
| *C10G 45/08* | (2006.01) |
| *C10G 45/06* | (2006.01) |

(52) U.S. Cl.
CPC ............... *B01J 31/26* (2013.01); *B01J 21/04* (2013.01); *B01J 21/18* (2013.01); *B01J 23/881* (2013.01); *B01J 23/882* (2013.01); *B01J 23/883* (2013.01); *B01J 31/04* (2013.01); *B01J 35/0006* (2013.01); *B01J 35/1019* (2013.01); *B01J 35/1042* (2013.01); *B01J 35/1047* (2013.01); *B01J 35/1061* (2013.01); *B01J 35/1066* (2013.01); *B01J 37/0018* (2013.01); *B01J 37/0201* (2013.01); *B01J 37/04* (2013.01); *B01J 37/084* (2013.01); *C10G 45/06* (2013.01); *C10G 45/08* (2013.01); *B01J 2231/323* (2013.01); *B01J 2531/004* (2013.01); *B01J 2531/005* (2013.01); *C10G 2300/205* (2013.01)

(58) Field of Classification Search
None
See application file for complete search history.

(56) References Cited

U.S. PATENT DOCUMENTS

| | | |
|---|---|---|
| 4,411,824 A | 10/1983 | Chen |
| 4,743,353 A | 5/1988 | Ting et al. |
| 8,431,018 B2 | 4/2013 | Malty et al. |
| 2010/0304963 A1 | 12/2010 | Singh et al. |

*Primary Examiner* — Colin W. Slifka
(74) *Attorney, Agent, or Firm* — Richard C. Litman

(57) ABSTRACT

A hydrodemetallization (HDM) catalyst includes an alumina and carbon extrudate support having a weight ratio of about 1:1 alumina to carbon and bimodal type pore size distribution, i.e., both meso-porosity and macro-porosity. The support can be impregnated with at least one hydrogenation active metal and, optionally, at least one promoter metal from the transition metals of Groups 6, 8, 9, and 10 of the Periodic Table. The hydrogenation active metal can be, for example, Mo, W, and Fe. The promoter metal can be, for example, Co, Ni, and Fe. The catalyst may further include ethylene diamine tetra acetic acid (EDTA).

3 Claims, 18 Drawing Sheets

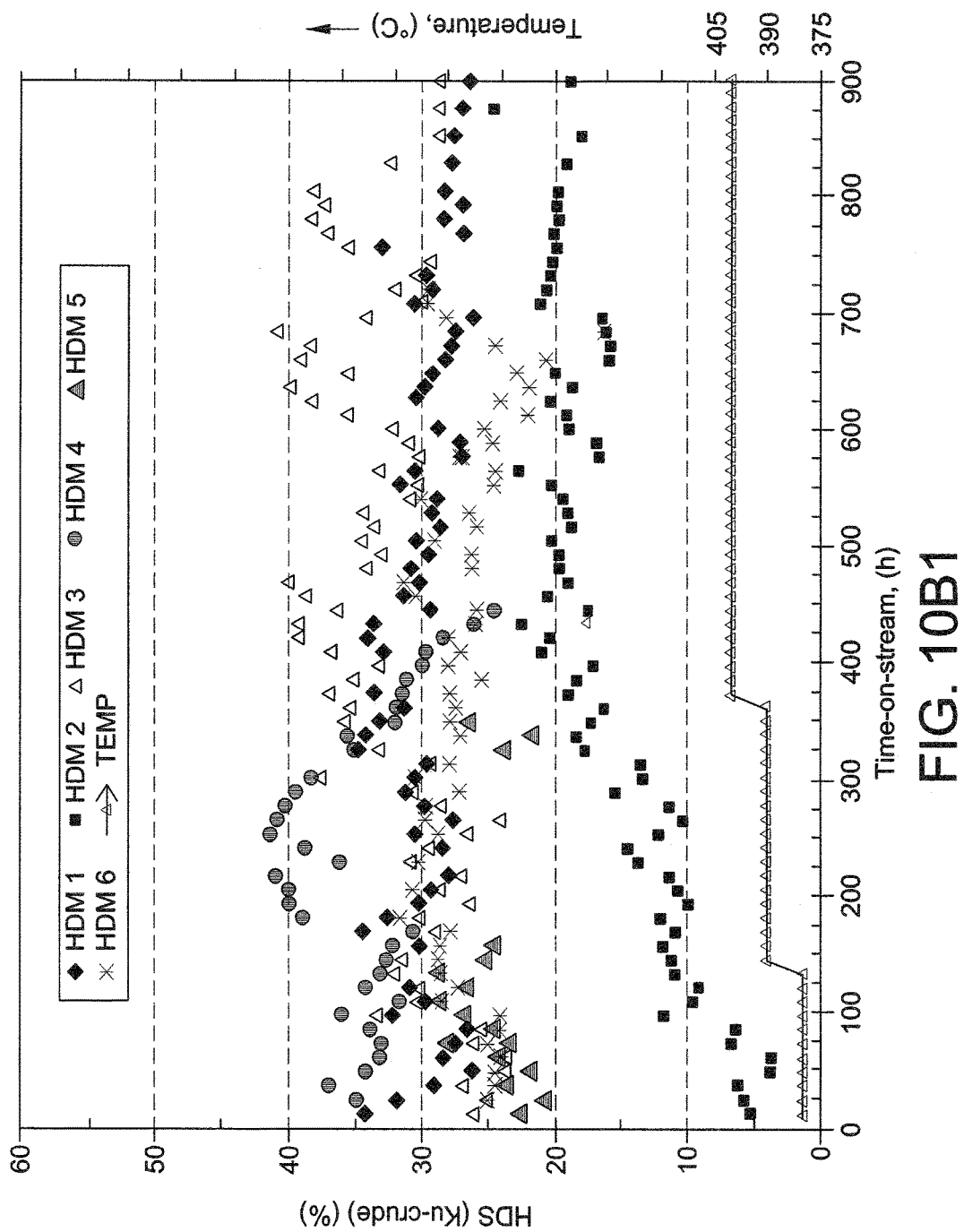
FIG. 10B1

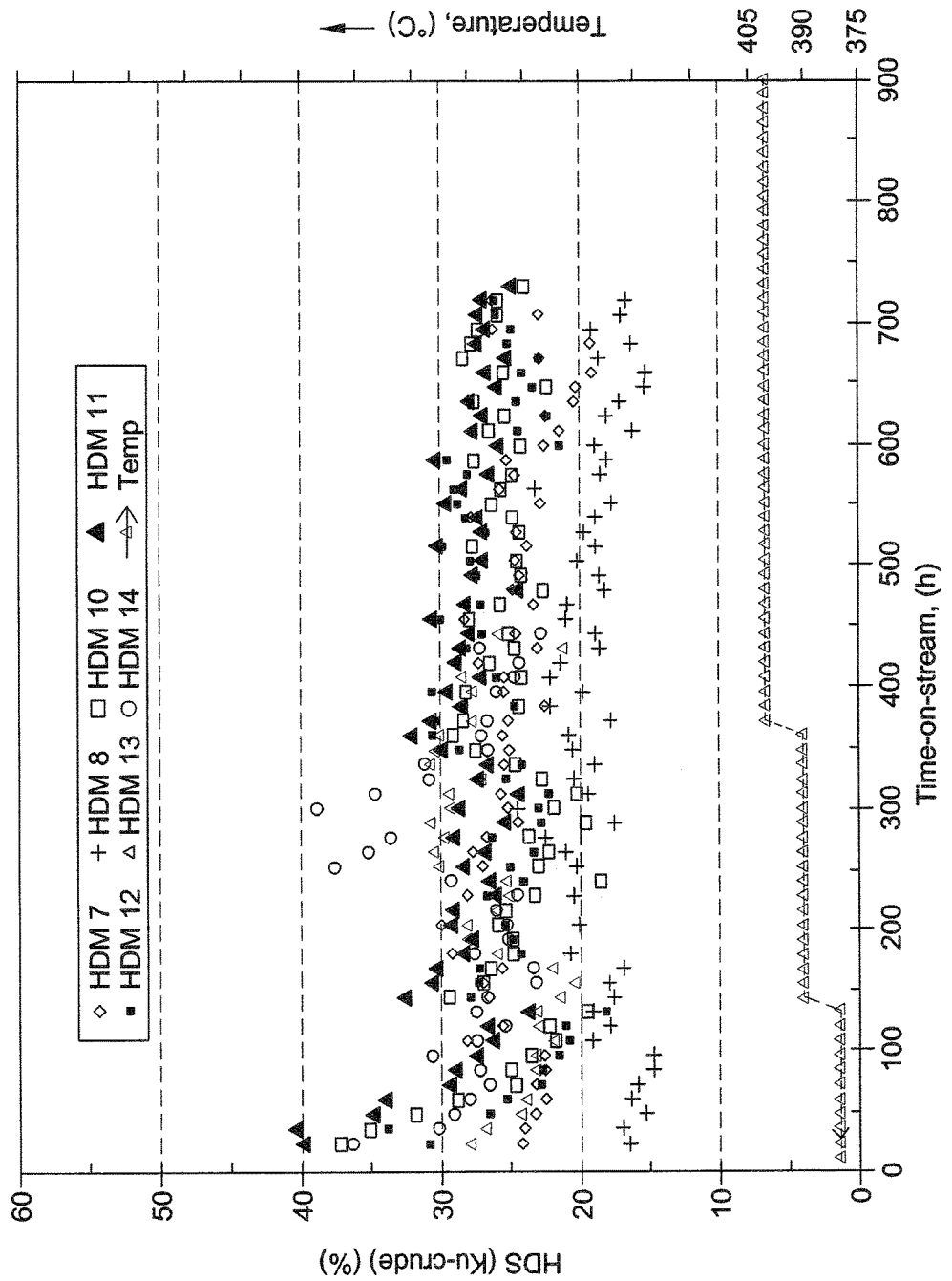
FIG. 10B2

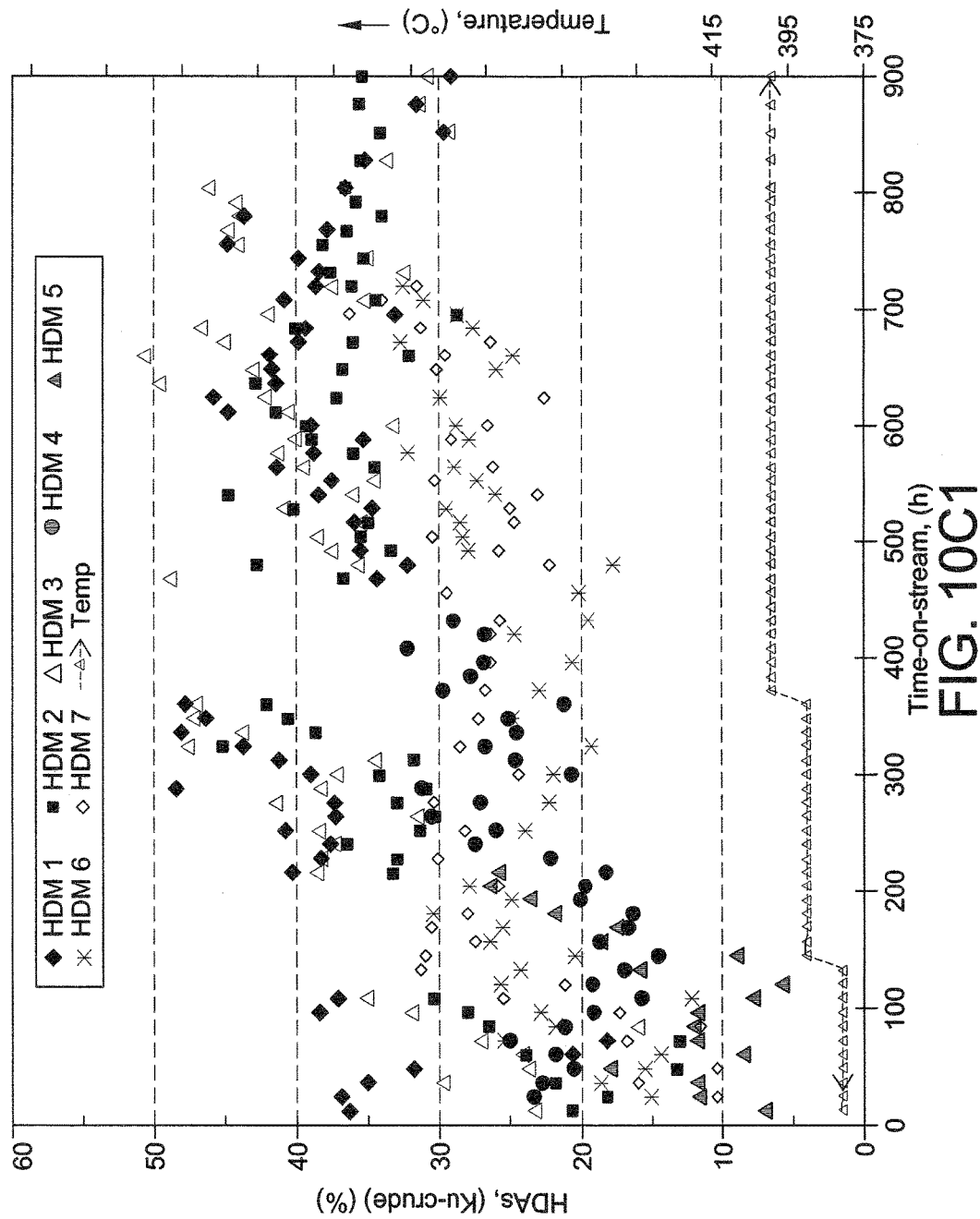
FIG. 10C1

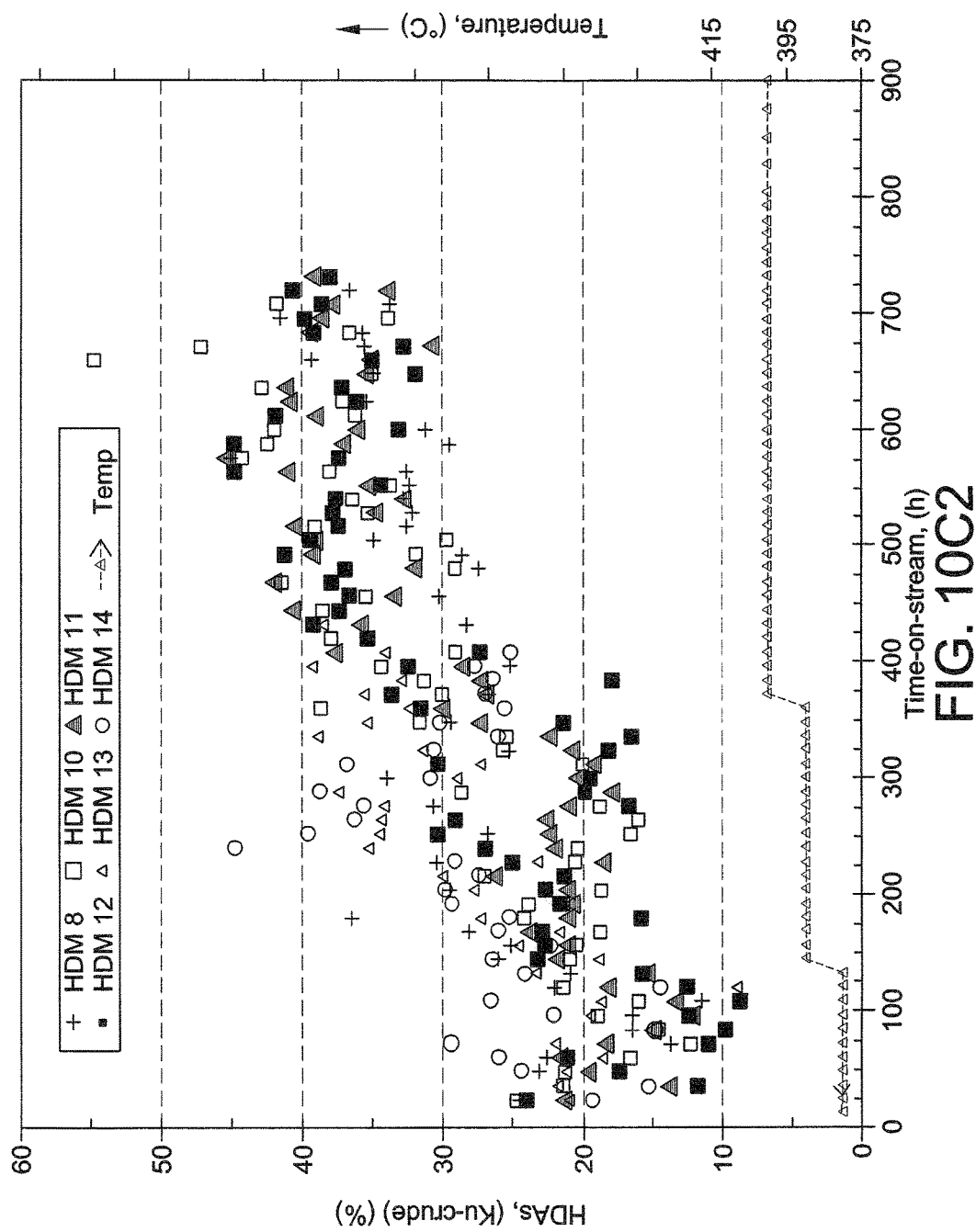
FIG. 10C2

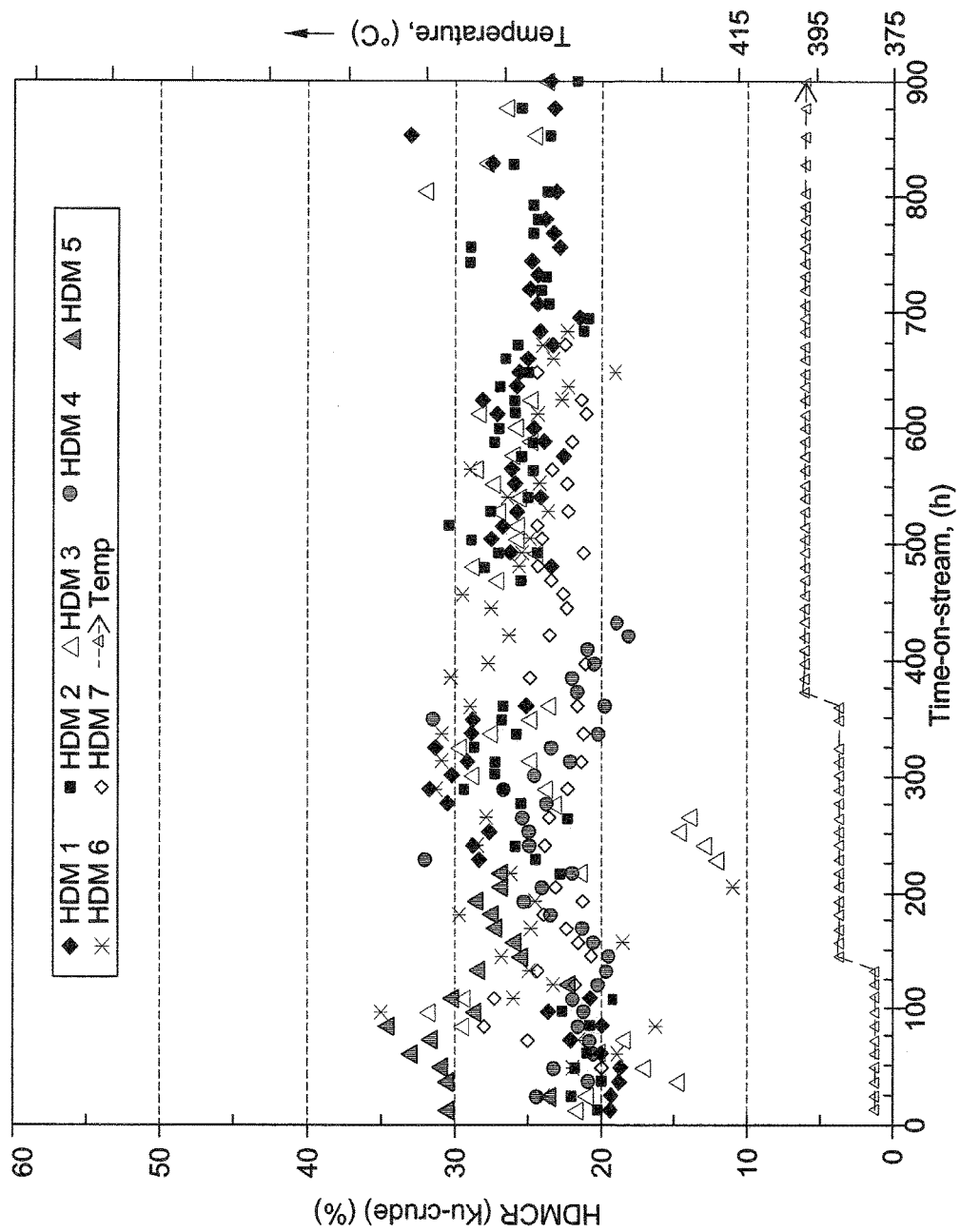
FIG. 10D1

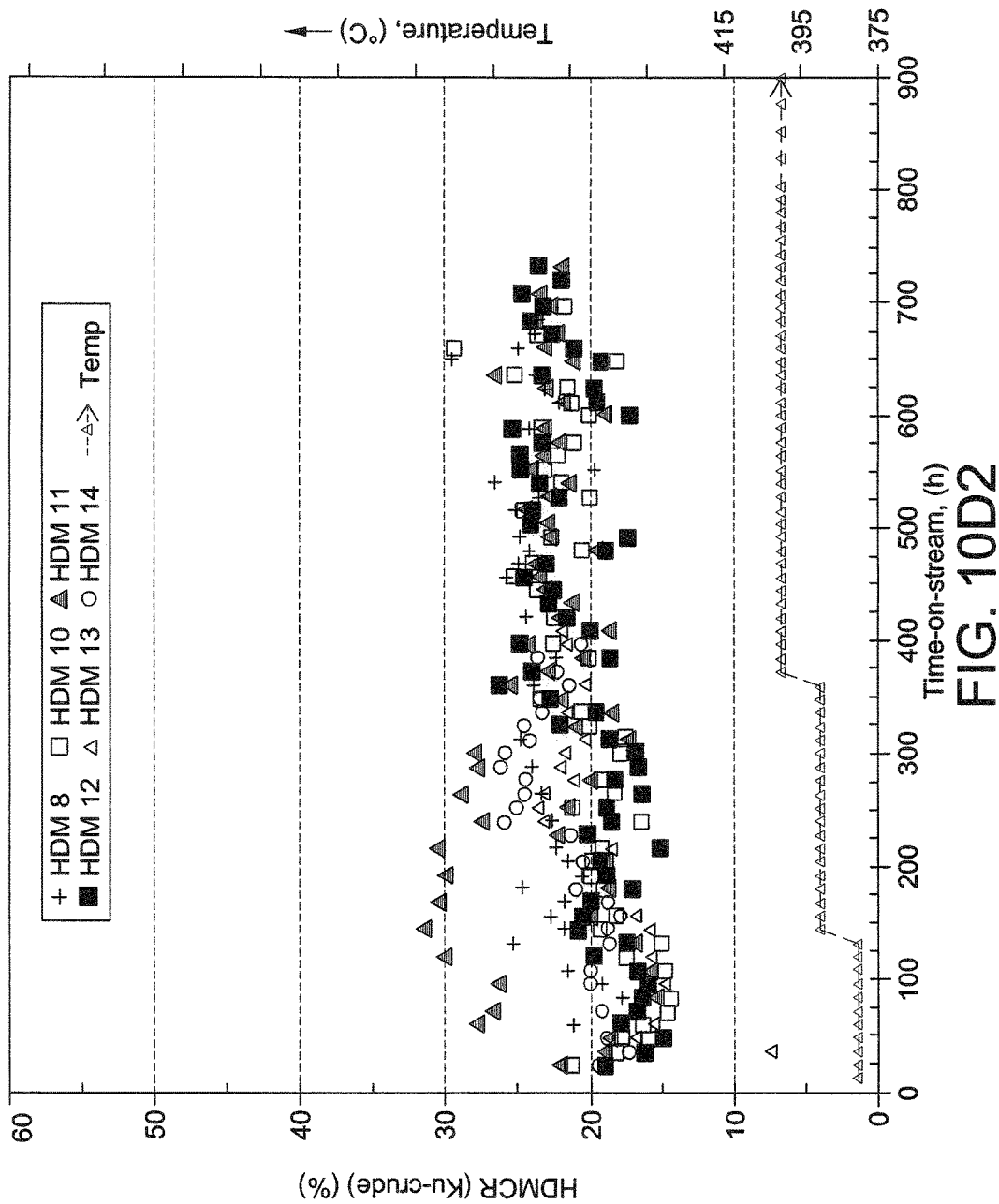
FIG. 10D2

HYDRODEMETALLIZATION CATALYSTS

BACKGROUND OF THE INVENTION

1. Field of the Invention

The present invention relates to metallic catalysts, and particularly to the preparation of hydrodemetallization (HDM) catalysts for heavy crude oil processing processing and residue.

2. Description of the Related Art

Heavy and extra heavy crude oils are playing an increasingly important role in meeting the growing demands for energy worldwide. The difficulties associated with heavy oils (API gravity 10.0-20.0°) and residues upgrading are directly related to the contents of metals and asphaltene in these feedstock. Residue fluid catalytic cracking (RFCC) process has shown a noticeable success over the past decades in residue upgrading. With the deterioration in feedstock quality and the introduction of heavy crude oils, however, shortcomings in RFCC are becoming more apparent.

The most promising alternative to RFCC today is the residue hydroprocessing, such as Atmospheric Residue Desulfurization (ARDS) and the On-stream Catalyst Replacement (OCR), which can handle feedstock with high level of impurities, provide selective yield, and produce high-quality products. ARDS process falls under the trickle-bed technology, and it is considered one of the most mature technologies for residue hydrotreatment. The performance of this process is quite complicated, as it consists of 3-4 reactors and a multiple catalyst system. The main objectives of the ARDS process are to extract the hetero-atoms (i.e., sulfur, S; nitrogen, N; nickel, Ni; vanadium, V, etc.) that exist in the residues and to partially crack the heavy fractions into lighter products in the presence of hydrogen. In commercial ARDS process, the front-end of the catalyst system is the hydrodemetallization (HDM) catalyst. The objective of this catalyst is to protect the downstream catalysts; namely hydrodesulfurization (HDS) and hydrodenitrogenation (HDN), by removing most of the metals from the feedstock.

One of the main challenges related to heavy oils processing is their considerable content of asphaltene. Asphaltene is the heaviest and the most complex molecule in crude oils and it is commonly considered the most refractory fraction to process. Asphaltene molecules are composed of polycyclic aromatic hydrocarbons that contain significant amounts of heteroatoms (S and N) and metals (Ni and V). During hydroprocessing of residual oils, asphaltene is considered the primary source for coke and metals depositions, which substantially decrease the catalyst activity. As such, it would be desirable to develop an improved guard-bed catalyst for ARDS.

Thus, a method of synthesizing guard-bed hydrodemetallization (HDM) catalyst solving the aforementioned problems is desired.

SUMMARY OF THE INVENTION

A hydrodemetallization (HDM) catalyst includes an alumina and carbon extrudate support having a weight ratio of about 1:1 alumina to carbon and bimodal type pore size distribution, i.e., both meso-porosity and macro-porosity. The support can be impregnated with at least one hydrogenation active metal and at least one promoter metal from the transition metals of Groups 6, 8, 9, and 10 of the Periodic Table. The hydrogenation active metals can include, for example, Mo, W, and Fe. The promoter metal can include, for example, Co, Ni, and Fe. The support can, for example, include from about 2% to about 10% by weight of the hydrogenation active metal and from about 1% to about 5% by weight of the promoter metal. The catalyst for hydrodemetallizing heavy crude oil and residue may further include ethylene diamine tetra acetic acid (EDTA). The catalyst sustains its hydrodemetallization activity for a period of at least 1200 hrs with time-on-stream. The catalyst typically has a high metal retention capacity, e.g., about 40% to about 50 weight %.

These and other features of the present invention will become readily apparent upon further review of the following specification and drawings.

BRIEF DESCRIPTION OF THE DRAWINGS

FIGS. 10B1 and 10B2 are for Ku crude; FIGS. 10C1 and 10C2 are graphs showing the hydrodeasphaltenization (HDAs) activities (Ku crude) for various prototype catalysts; FIGS. 10D1 and 10D2 are graphs showing the hydrodemicroresidue (HDMCR) activities (Ku crude) for various prototype catalysts.

Similar reference characters denote corresponding features consistently throughout the attached drawings.

DETAILED DESCRIPTION OF THE PREFERRED EMBODIMENTS

Figure 1:
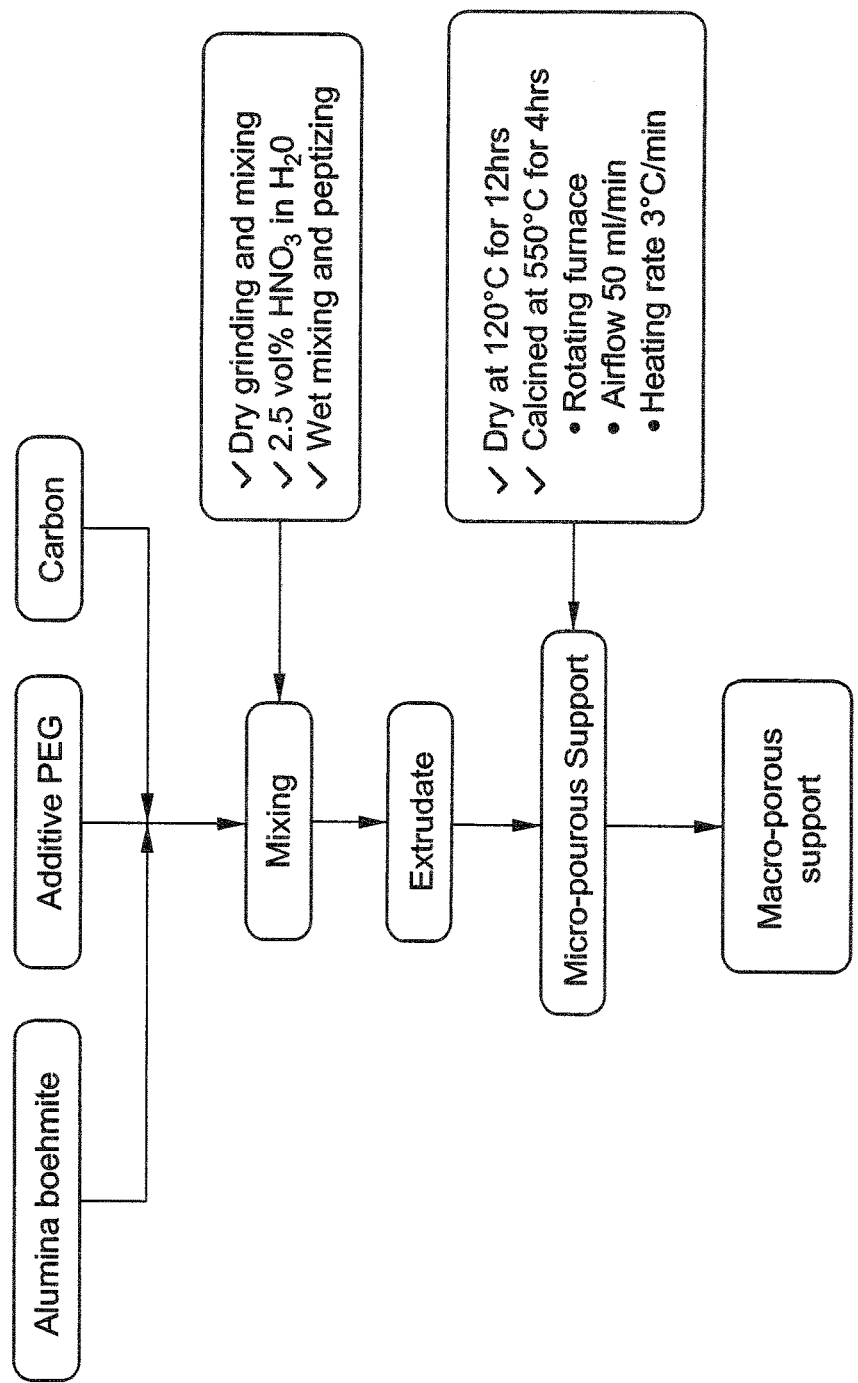
FIG. 1 shows a flow diagram of the method of preparing the support according to the present invention.

A hydrodemetallization (HDM) catalyst includes an alumina and carbon extrudate support having a weight ratio of about 1:1 alumina to carbon and bimodal type pore size distribution, i.e., both meso-porosity and macro-porosity. The support can be impregnated with at least one hydrogenation active metal and at least one promoter metal from the transition metals of Groups 6, 8, 9, and 10 of the Periodic Table. The hydrogenation active metal can be, for example, Mo, W, and Fe. The promoter metal can be, for example, Co, Ni, and Fe. The support can, for example, include from about 2% to about 10% by weight of the hydrogenation active metals and from about 1% to about 5% by weight of the promoter metal. For example, the support can be impregnated with low amounts of one or more metals from Group VIB and Group VIII B of the periodic table. The catalyst for hydrodemetallizing heavy crude oil and residue may further include ethylene diamine tetra acetic acid (EDTA). The catalyst sustains its hydrodemetallization activity for a period of at least 1200 hrs with time-on-stream. The catalyst typically has a high metal retention capacity, e.g., about 40% to about 50 weight %. The catalyst pores can include a first plurality of pores having an average pore size of about 8 nm and a second plurality of pores having an average pore size of about 250 nm. More than 50% of the pores can have a diameter greater than 100 nm. The catalyst can have a total pore volume in the range of about 0.5 ml/g to about 1.1 ml/g and a pore area in the range of about 110 $m^2/g$-250 $m^2/g$.

A method for preparing an alumina/carbon catalyst support includes: providing alumina; adding a peptizing agent to a first portion of the alumina to provide an alumina wet elastic paste; adding carbon, water, and a remaining portion of the alumina to the alumina wet elastic paste; extruding the paste, e.g., in a mechanical extruder at a constant speed, to obtain an extrudate; drying the extrudate, e.g., maintaining the extrudates at 25° C. for about 24 hours and then drying at 120° C. for about 12 hours; calcining the extrudate, e.g., at about 550° C. for about 4 hours, to provide the alumina/carbon catalyst support. A pore enlarging agent can also be added to the first portion of the alumina with the peptizing agent. The paste can be maintained at room temperature for about 2 hours prior to extruding. The calcining step can be conducted using a heating gradient of 2.5° C. in the presence of air. The peptizing agent can include nitric acid solution and a pore enlarging agent such as polyethylene glycol. The optimum textural properties were obtained when the carbon to alumina weight ratio was 1:1. The calcination can be performed in a rotating quartz furnace tube with an oscillation frequency of 1 to 8 rotations per minute and at a rotation angle of 315 degrees. The alumina/carbon support catalyst can have an active carbon content of from about 10 wt. % to about 75 wt. % of the support.

A method of preparing a catalyst supported on an alumina/carbon support includes providing the alumina/carbon support; impregnating the alumina/carbon support with an active metal and optionally with a promoter metal to produce an impregnated alumina support; drying the impregnated alumina/carbon support, e.g., at 120° C. for about 12 hours and, optionally, calcining the impregnated alumina support, e.g., at about 450° C. for about 4 hours. The step of impregnating can include co-impregnation of active metals and promoters (Co+Mo or Co+Fe or Fe+Mo), co-impregnation of active metals and promoters along with chelating agents ethylenediamine (EDTA) (Co+Mo+EDTA), and sequential impregnation of active metals and promoters along with EDTA [Mo+(Fe+EDTA)]. The active metal can include at least one of Fe, Mo and W and the promoter can include at least one of Co, Ni, and Fe.

HDM catalysts can be sufficiently active toward metal removal and capable of handling large metal capacities to ensure satisfactory run duration. The large pores in these catalysts enhance the metal capacity and decrease the chance of rapid pore mouth plugging. The retention capacity in HDM catalysts can go up to 100%, expressed in weight of metals (Ni+V) in relation to the weight of a fresh catalyst. The outer surface of the HDM catalyst typically has macropores while the inner surface has mesopores. Such pore distribution allows large molecules, which contain metals, to diffuse into the mesopores located inside the catalyst grains, where the metal will be extracted and deposited in the form of metal sulfides. The metals of primary importance include the porphyrin forms of vanadium (V) and nickel (Ni). In addition to pore structure, the catalyst chemical composition also has significant influence on the HDM activity. The chemical composition has an impact on both the acidic sites and the metal active sites. The acidic sites are normally responsible for the cracking activity, isomerization, and alkylation while the metal active sites control hydrotreatment, hydrocracking, reforming, and isomerization. These two sites commonly operate together in what is known as dual-function catalysts.

Asphaltene molecules are composed of polycyclic aromatic hydrocarbons that contain significant amounts of heteroatoms (S and N) and metals (Ni and V). During hydroprocessing of residual oils, asphaltene is considered the primary source for coke and metals depositions, which substantially decrease the catalyst activity. Coke deposition is normally associated with the rapid initial deactivation, in which the coke deposits on the acidic sites and micropores. Coke deposition is physical in nature and the carbonaceous deactivation can be largely recovered by oxidative regeneration of the catalyst. Metals depositions, on the other hand, normally occur near the pore mouth and over the coordinated unsaturated sites and result in essentially non-reversible deactivation. Spent catalyst characterizations indicated that the depositions of metal sulfides (VxSy and NixSy) mainly depend on the catalyst pore diameter; larger pore diameter contains higher amount of deposited species.

The HDM catalysts described herein include guard-bed catalysts for residue hydrotreatment (ARDS). The HDM catalysts include optimized textural properties (i.e., specific surface area, SSA; total pore volume, TPV; pore shape; and pore size distribution, PSD). The textural properties of supports and supported catalysts were characterized by mercury porosimetry. The support extrudates are thermally treated at optimized activation conditions to generate the bimodal type pore size distribution (meso-and maco-porosity). The optimized textural properties enhance metal storage capacity and minimize diffusion limitation, which consequently improves the conversion of asphaltene molecules. The considerable affinity of carbon in the support for adsorbing asphaltene and metal porphyrins significantly reduces coke and metal depositions on catalytic sites, thus enhancing the stability of the catalyst. The majority of carbonaceous species and metals selectively deposit on the support surface rather than the pore mouth or catalytic sites. Carbon is also known for the low metal-support interaction, which promote the generation of Type II (Co—Mo—S) sites, known for their high HDM and HDS activities.

The catalyst development protocol can be conducted in two stages; a first stage for preparing the support formulation and a second stage for preparing the catalyst. The HDM catalysts can be prepared by impregnating support extrudates with low content of active metals (i.e., Mo and Fe) and promoters (i.e., Fe, Co and Ni), with and without ethylene diamine tetra acetic acid (EDTA). The activity and the stability of all catalysts were assessed by using the atmospheric residue of Lower-Fars crude oil (one of Kuwait's heaviest crudes) and Mexican Ku crude oil, which is known for its high metal content. The following examples are provided by way of illustration.

Example 1

Pretreatment of Support and its Composition

Various supports were prepared by physically mixing different ratios of carbon and alumina to optimize the textural properties of the support, Commercially available Versal pseudo Boehmite alumina was used as a binder for preparing the alumina-carbon support. The textural and mechanical properties for HDM catalyst were optimized by using different ratios of activated carbon and alumina. The support composition was physically mixed in a ball-mill and subsequently the kneading of the alumina and carbon powders was performed with a selected peptizing agent. The peptizing agent included the pore-enlarging agent (Polyethylene glycol, PEG). First, an aqueous 2-5 vol. % $HNO_3$ acid solution was used to peptize boehmite and prepare a paste (semi-wet), kneading all component to a wet plastic, which was subsequently extruded in a defined shape and diameter. Water was used during the kneading to mill and mold acceptably in the extruder to obtain a cylindrical configuration with an average outer diameter of 2.5 mm. The solid extrudates were maintained at room temperature for 24 hours then dried at 120° C. for 12 hours. The dried extrudates had an average length of about 6-8 mm. Finally, a 25 gram batch of extrudates was calcined at 550° C. for 4 hours, using a heating gradient of 2.5° C./min in the presence of 50 ml/min air. The calcination was performed in a rotating quartz furnace tube with an oscillation frequency of 1-8 rotation/minute and a rotation angle of 315° in each direction to ensure good mixing of air. During calcinations, the macro-pores were formed in the support through the complete burning of PEG and the partial burning of carbon. The pore enlarging agent only reacts physically with alumina and carbon. The activation procedure of the alumina-carbon supports was established and optimized in the lab to obtain the best textural and mechanical properties of support. The proposed catalysts have a total pore volume and pore area in the range of 0.5 ml/g-1.1 ml/g and 110 $m^2/g$-250 $m^2/g$, respectively.

Figure 2:
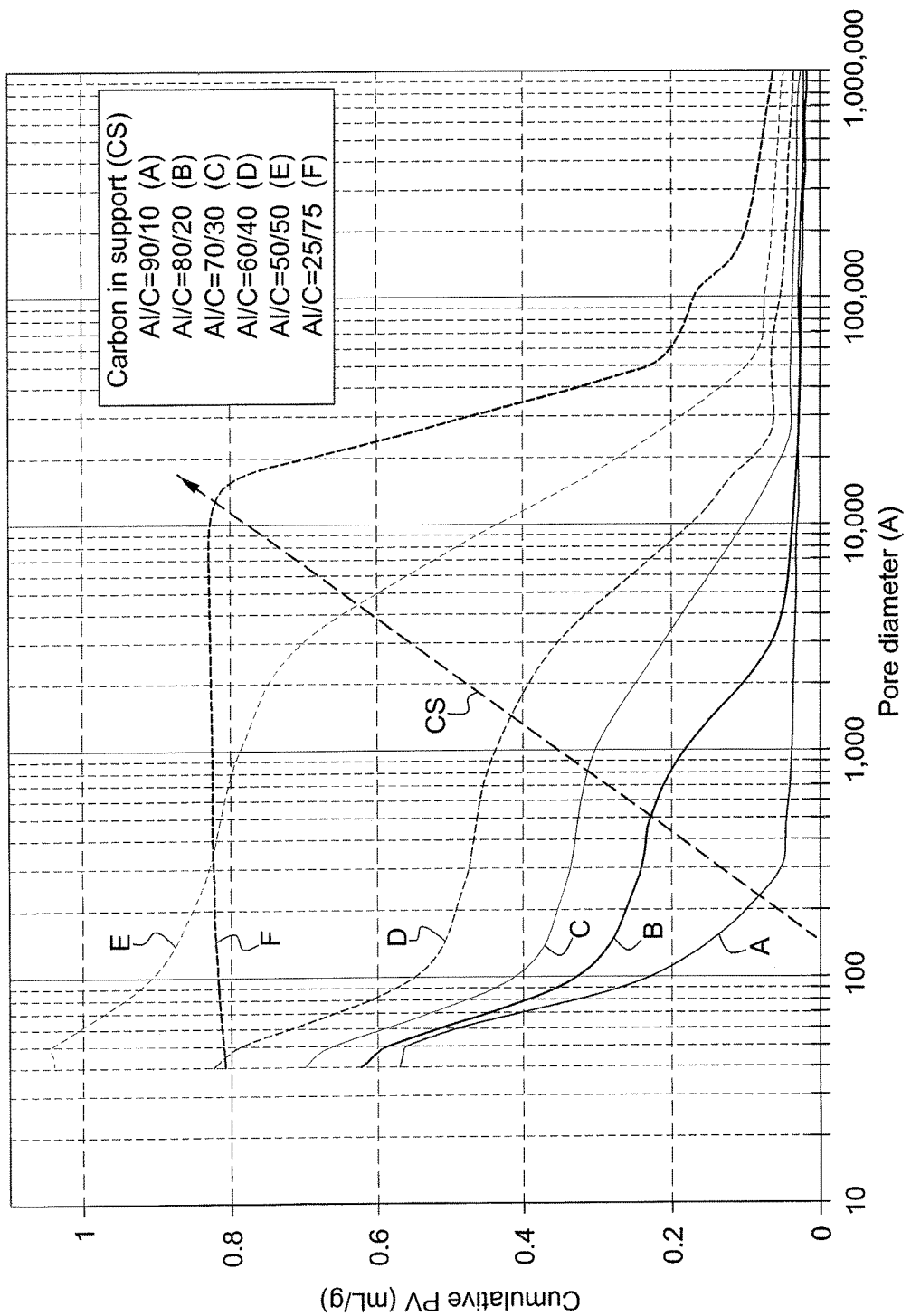
FIG. 2 is a graph showing the impact of carbon concentration on support textural properties (Al/C=Aluminum/Carbon weight ratio).

The different carbon concentrations in the various supports (A, B, C, D, E, F) contributed to the development of different textural properties. FIG. 1 summarizes the overall support preparation flow sheet. FIG. 2 exemplifies the impact of carbon concentration in support textural properties.

FIG. 2 illustrates the cumulative pore volume and the pore diameter for the various carbon-alumina supports. The Fig. clearly indicates that carbon content in support significantly contributes to the increase in the cumulative pore volume and the pore diameter. Support F, with the highest carbon content (75 wt. %), has comparatively more macro-pores than the rest. However, this support, after the partial burning of carbon through calcination, has very poor physical properties, such as attrition loss and mechanical strength. On the other hand, supports A-D, with relatively low carbon content in support (10-40 wt. %), have relatively smaller pore diameter and less cumulative pore volume, but better mechanical properties. The textural properties of supports A-D seem to gradually enhance as the carbon content increases in the support. In terms of pore size distribution, both support A and F have mono-modal type of pores, where support A contains mainly small pores while support F has predominantly large pores. In contrast, supports B to E have bi-modal type of pores and their pore diameter increases with the carbon content in alumina support. The optimum textural and mechanical properties are obtained when the alumina-carbon weight ratio is 1:1; support E.

The supported catalysts are bi-modal in nature, with smaller pores being about 8 nm in diameter and larger pores being about 250 nm in diameter. Thus, bimodal support provides; i) large numbers of meso-pores and macro-pores (more than 50% pores are at least greater than 100 nm in diameters with variation of active metals); and ii) with variation of support composition (catalyst HDM-3 to HDM-8) greater than 100 nm pores vary 6 to 100%. Apart from macro-pores, a considerable number of pores are 5-50 nm, 15 to 40%, except HDM-8 which has 100% pores greater than 100 nm diameter. Therefore, large pores in the catalysts were developed, which allow the diffusion of large molecules (i.e., asphaltenes) to the deep catalytic sites. Thus, the utilization of carbon in the catalyst helped in overcoming problems associated with asphaltene diffusion through the pores.

Example 2

Preparation of Catalyst

Once the desired textural properties were achieved in the support, the supported catalysts were prepared by the incipient wetness impregnation method, using various active metals and promoters. HDM catalysts are known for their low metal content, therefore, the selection of the active phase and the dispersion of active sites on the support were crucial for their HDM activity. The impregnation solutions in this study contained various components, such active metals, promoters, and other additives, such as ethylene di-amine tetra acetic acid (EDTA). The impregnation was carried out on the dried and calcined support extrudates (2 mm×4 mm) using water retention capacity of support, in order to prepare exact volume of metal salts solutions. Metal loading on the support were performed using different techniques such as (i) co-impregnation of active metals and promoters (Co+Mo or Co+Fe or Fe+Mo), ii) co-impregnation of active metals and promoters along with chelating agent EDTA (Co+Mo+EDTA), and iii) sequential impregnation of active metals and promoters along with EDTA [Mo+(Fe+EDTA)]. The presence of EDTA in catalyst (uncalcined) provided better dispersion of promoter around the molybdenum, mainly due to the EDTA complex with promoter (Co or Fe), which delay sulfidation and expected to decor edges or corner sites of $MoS_2$.

Figure 3:
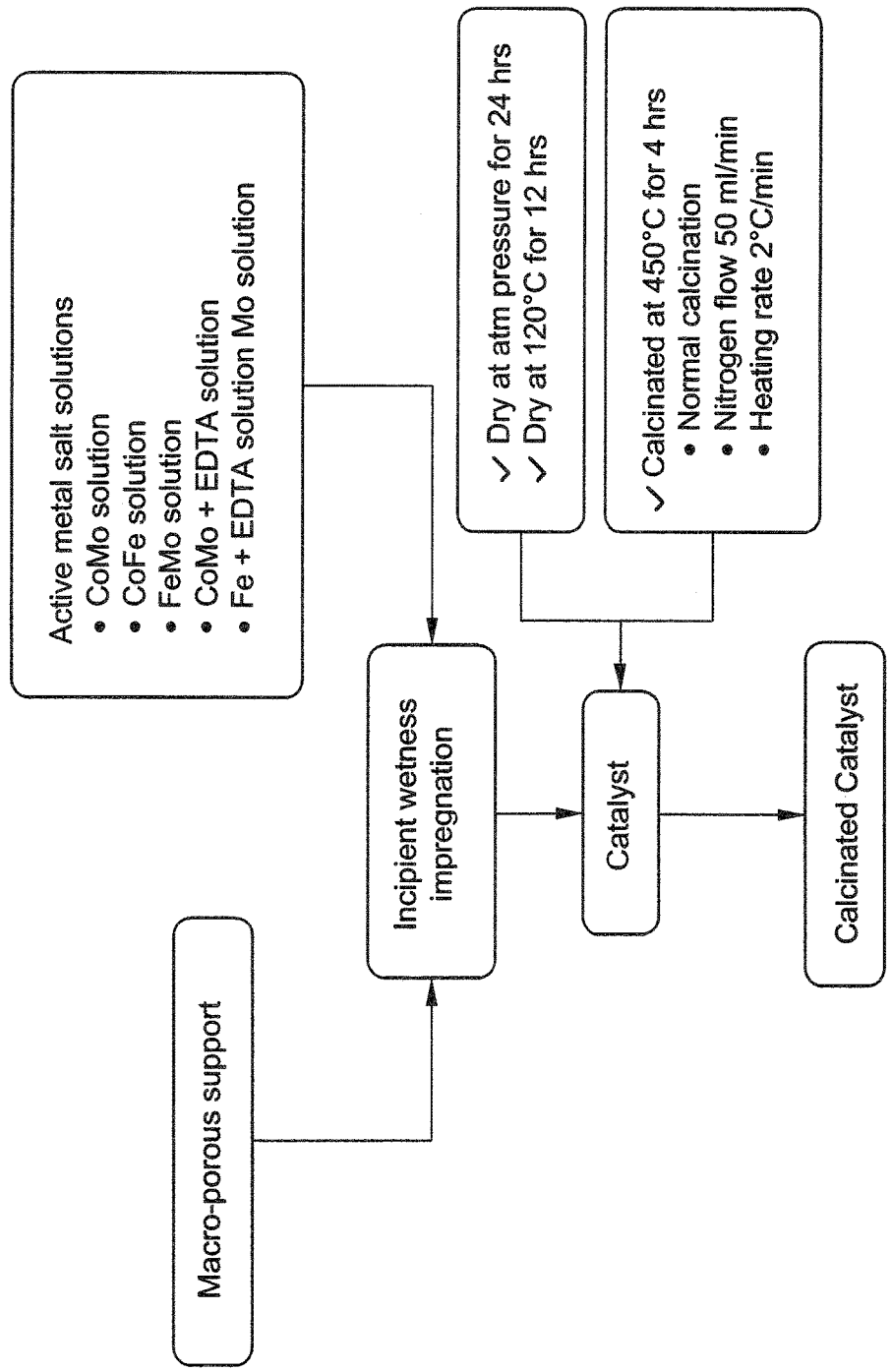
FIG. 3 is a flow diagram for preparing the catalysts using the incipient wetness impregnation method.

The supports reported in Example 1 were used to prepare different catalysts, which comprises at least one hydrogenation active metals (Mo, W, Fe) along with a promoter (Co, Ni, Fe) selected from the transition metals of Groups 6, 8, 9, 10 of Periodic Table, preferably in the form of metal salts. The most preferred hydrogenation compounds are the oxides and/or the sulfides of Mo, Co, Ni. The catalysts were prepared using incipient wetness impregnation method and the flow diagram of their preparation is as shown in FIG. 3. The calcined, dried and desiccated support extrudates were placed in contact with an aqueous solution (based on support water retention capacity) that contain the active metals, promoters, and in certain cases chelating agents (EDTA). The concentrations of active metals and promoters in the catalyst were low to keep support surface bare for the metals and carbon depositions during the hydrodemetallization.

The impregnated supports, i.e., catalysts, were then dried at 120° C. for 12 h. The dried catalyst particles were calcined at 450° C. for 4 h to obtain the final catalysts in an oxidized form. Catalysts prepared with chelating agents, i.e., EDTA, were not calcined. The metal precursors used in the impregnation process were ammonium heptamolybdate tetrahydrate [$(NH_4)_6MO_7O_{24}.4H_2O$], cobalt(II)nitrate hexahydrate [$Co(NO_3)_2.6H_2O$], nickel(II)nitrate hexahydrate [$Ni(NO_3)_2.6H_2O$], and Iron(III) nitrate or ferric nitrate [$Fe(NO_3)_3$ $9H_2O$]. The final composition of a calcined supported catalyst contains about 0 to 10 wt. % of Mo, 1-5 wt. % of Co(Ni) and 0-9 wt. % Fe on the weight basis. The compositions of all catalysts are given in Table 1 below.

TABLE 1

Catalyst Composition

| Support | Sample ID | Metal, wt. % | | | |
|---|---|---|---|---|---|
| | | Mo | Fe | Co(Ni) | EDTA |
| E | HDM-1 | 5.44 | 3.83 | 1.09 | na |
| E | HDM-2 | na | 8.80 | 1.16 | na |
| E | HDM-3 | 5.55 | 5.02 | na | na |
| A | HDM-4 | 5.52 | 1.58 | na | na |
| B | HDM-5 | 5.59 | 2.31 | na | na |
| C | HDM-6 | 5.48 | 3.29 | na | na |
| D | HDM-7 | 5.18 | 4.12 | na | na |
| F | HDM-8 | 6.79 | 11.8 | na | na |
| E | HDM-10 | 7.11 | 3.65 | 1.84 | na |
| E | HDM-11 | 6.68 | 3.47 | (2.23) | na |
| E | HDM-12* | 6.32 | 3.38 | 1.62 | EDTA |
| E | HDM-13* | 6.27 | 4.60 | Da | EDTA |
| E | HDM-14 | 9.88 | Na | 2.5 | na |

*catalyst prepared with EDTA; na: not applicable.

Example 3

Catalyst Evaluation

Figure 4:
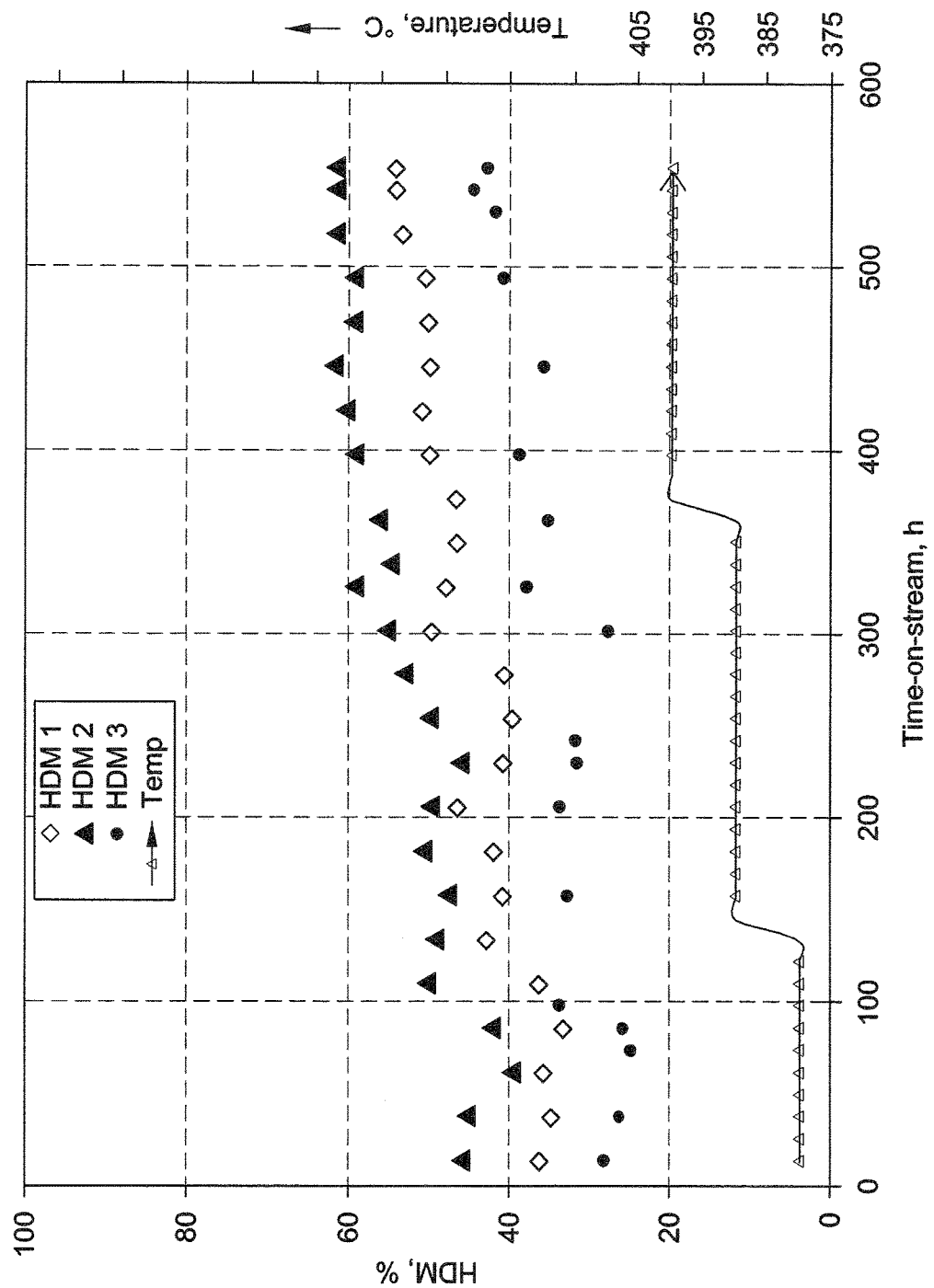
FIG. 4 is a plot of the hydrometallization (HDM) activity of prototype catalysts of similar support composition (alumina-carbon weight ratio is 1:1) but having different active metals (HDM-1, CoMo; HDM-2, CoFe; and HDM-3, FeMo), tested with LF-AR at different reaction temperatures.

In this example, three catalysts, prepared in Example 2, were tested for their catalytic activities using Lower Fars Atmospheric Residue (LF-AR) as feedstock. The composition and physical properties of this feedstock are provided in Table 2. Catalysts used in this Example comprise support E, which is the optimum support in terms of textural and mechanical properties, with variation in hydrogenation active metals. The active phase compositions in the three catalysts are CoMo, CoFe and FeMo, which respectively correspond to catalyst HDM-1, HDM-2 and HDM-3. The hydrodemetallization activities of these catalysts are shown in FIG. 4. The comparison between the catalytic activities clearly exemplifies the impact of active phase composition, where the active catalytic sites are mainly generated by Mo and endorsed by the metal promoters. Without Mo presence, catalyst HDM-2 (FeCo) showed the lowest activity, which suggest the limitation of Fe as the main active metal for hydrogenation or hydrodemetallization function. However, Fe was effectively used as a promoter to Mo as shown in catalysts HDM-3.

The catalyst evaluation tests in this study were performed in a multiple micro-reactor fixed-bed unit that emulates the hydrotreating reactions in commercial hydroprocessing units. Prior to the activity test, 15 ml of the catalyst was diluted with fine carborandom (1:1) and loaded into the middle zone of the reactor. The loaded catalyst was presulfided using the wet sulfiding method, in which straight run gas oil (SRGO) is spiked with a 1 vol. % of carbon disulfided ($CS_2$) and pumped into the reactor at elevated pressure and temperature. Catalyst presulfiding is widely practiced in the petroleum refining industry and its positive impact has been significantly noticed in the hydrotreating processes. It mainly creates the essential surface required for the optimum activity by transforming the form of active sites from metal oxide to metal sulfide. Upon the completion of sulfidation pretreatment, which normally lasts for 24 hrs, the testing feedstock (LF-AR) was introduce. The catalyst evaluation tests were conducted under variable temperatures mode (i.e., 380, 390, and 400° C.) while other operating conditions were fixed; LHSV=1.0 $hr^{-1}$, feed flow rate=15 ml/hr; $H_2$ flow rate=10.2 Nl/hr, $H_2$/Oil=680, and Pressure=120 bar. Two samples of reaction products were collected each day at the end of every 12 hours. The volume of each sample was 60 ml and was analyzed for sulfur, nickel, vanadium, asphaltene, micro carbon residue (MCR), and density.

TABLE 2

Properties of Lower Fars Atmospheric Residue (LF-AR)

| Property | LF-AR Feedstock |
|---|---|
| Sulfur, wt % | 6.5 |
| Vanadium, ppm wt. | 159.32 |
| Nickel, ppm wt | 52.98 |
| Fe, ppm wt | na |
| Na, ppm wt | na |
| Total metals (Ni + V + Fe + Na) | 212.3 |
| Asphaltenes, wt % | 7.3 |
| Conradson Carbon Residue, wt % | 16.345 |
| Viscosity at 40° C., CSt | 6916 |
| Viscosity at 100° C., CSt | 120 |
| Density @ 15° C., g/cc | 1.02286 |
| Density @ 65° C., g/cc | 0.9926 |
| API gravity, ° | ≈12 |
| Water content, wt ppm | na |
| Trace analysis (SEM-EDX) | |
| Al, ppm | 4.7 |
| Si, ppm | 7.2 |
| Ca, ppm | 27.2 |
| Fe, ppm | 32.4 |
| Ni, ppm | 43.5 |
| V, ppm | 165.0 |
| S, ppm | 7.8 |
| C, ppm | 92.2 |
| Total (S + C) | 99.93 |

Example 4

Catalyst Evaluation

Figure 5:
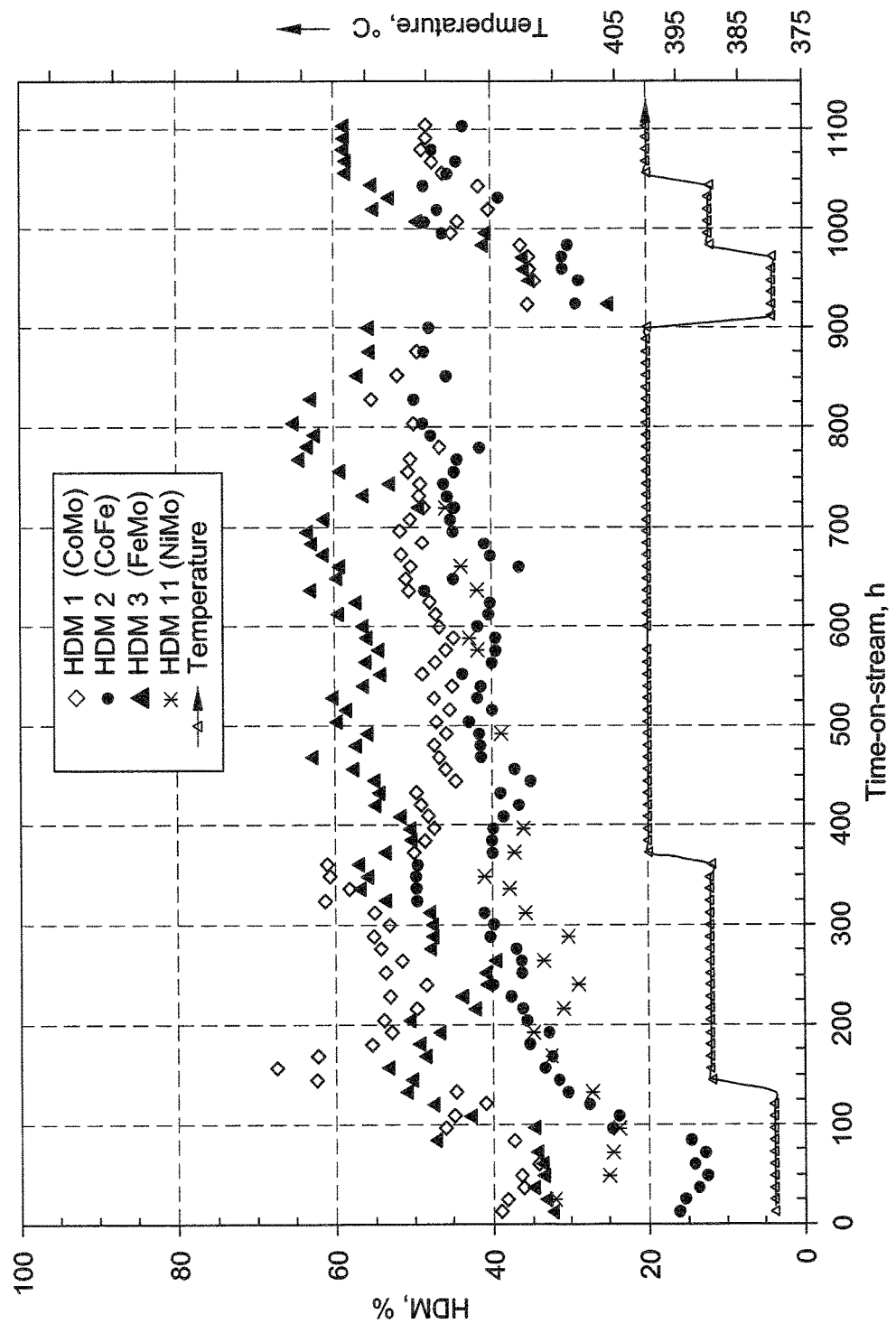
FIG. 5 is a plot of the HDM activity of prototype catalysts of similar support composition (alumina-carbon weight ratio is 1:1) but different active metals (CoMo, FeMo, NiMo and CoFe) tested with Ku-crude oil at different reaction temperatures.

The embodiment used in this example is prepared by a procedure similar to the one indicated in Example 3. The catalyst evaluation tests in this example were performed with a more difficult feedstock to help in conducting accelerated tests, which determine the metal retention capacities in shorter TOS. For such evaluation test, Mexican Ku crude oil has been chosen because it is well reputed for its high metal content. The properties of Ku heavy crude oil (i.e., originated from Mexico) are shown in Table 3. The catalysts evaluated in this example are similar to the ones assessed in example 3; however, one more catalyst has been added, HDM-11, that has similar support, type E, but different active phase, NiMo. More information about catalyst HDM-11 is indicated in Table 1. The evaluation tests of this example were carried out under operating conditions similar to the ones described in example 3. The hydrodemetallization activities of the four catalysts (HDM-1, HDM-2, HDM-3 and HDM-11) are shown in FIG. 5.

In agreement with Example 3, the best overall HDM activity was observed in catalyst HDM-3 followed by HDM-1. The superior HDM activities in HDM-3 and HDM-1 confirm the importance of molybdenum (Mo) for HDM reaction. FIG. 5 also suggests that HDM-3 has much better response to the increase in reaction temperature compare to HMD-1, which might be credited to the role of promotor (Fe promotor to Mo is used in HDM-3 while Co promotor to Mo is used in HDM-1). The reassessment of the initial activities for the tested catalysts, at the end-of-run, virtually shows no sign of deactivation at the three operating temperatures. The good stabilities in these catalysts are attributed to their optimized textural properties, which control the diffusion of complex hydrocarbon molecules and increase the metal retention capacity. The impacts of active metal impregnations on textural properties are illustrated in Table 4, where all catalysts were prepared by the same support (i.e., support E). The relatively better performance observed in HDM-3 can be credited the higher percentage of macro-pores (>100 nm) in the pore size distribution, as well as the selection of active phase (Mo promoted by Fe).

TABLE 3

Properties of Heavy Ku Crude Oil

| Property | Feedstock Ku Crude |
|---|---|
| Sulfur, wt % | 5.52 |
| Vanadium, ppm wt. | 475.76 |
| Nickel, ppm wt | 91.67 |
| Fe, ppm wt | 8.13 |
| Na, ppm wt | 3.28 |
| Total metals (Ni + V + Fe + Na) | 578.84 |
| Asphaltenes, wt % | 13.4 |
| Conradson Carbon Residue, wt % | 13.2 |
| Viscosity at 40° C., CSt | 5760 |
| Viscosity at 100° C., CSt | na |
| Density @ 15° C., g/cc | 0.9867 |
| Density @ 65° C., g/cc | 0.9543 |
| API gravity, ° | 16.7 |
| Water content, wt ppm | 550.8 |
| Trace analysis (SEM-EDX) | |
| Al, ppm | 0.0 |
| Si, ppm | 12.0 |
| Ca, ppm | 15.2 |
| Fe, ppm | 42.6 |
| Ni, ppm | 101.2 |
| V, ppm | 562.4 |
| S, ppm | 6.3 |
| C, ppm | 93.5 |
| Total (S + C) | 99.87 |

TABLE 4

Active metals effect on textural properties of supported catalysts (50/50)

| | Textural Properties | | | | | |
|---|---|---|---|---|---|---|
| | Pore area | TPV | APD | Pore Size Distribution, % | | |
| Sample Id | m²/g | ml/g | nm | <50 nm | 5-50 nm | >100 nm |
| HDM-1 (CoMo) | 181.2 | 0.948 | 20.9 | 26 | 20.8 | 53.2 |
| HDM-2 (CoFe) | 152.0 | 0.918 | 24.2 | 26 | 20.8 | 53.2 |
| HDM-3 (FeMo) | 172.1 | 1.044 | 25.4 | 19.9 | 18.7 | 61.4 |
| HDM-11 (NiMo) | 178.9 | 1.047 | 23.4 | 23.3 | 19.9 | 56.8 |

Figure 6A:
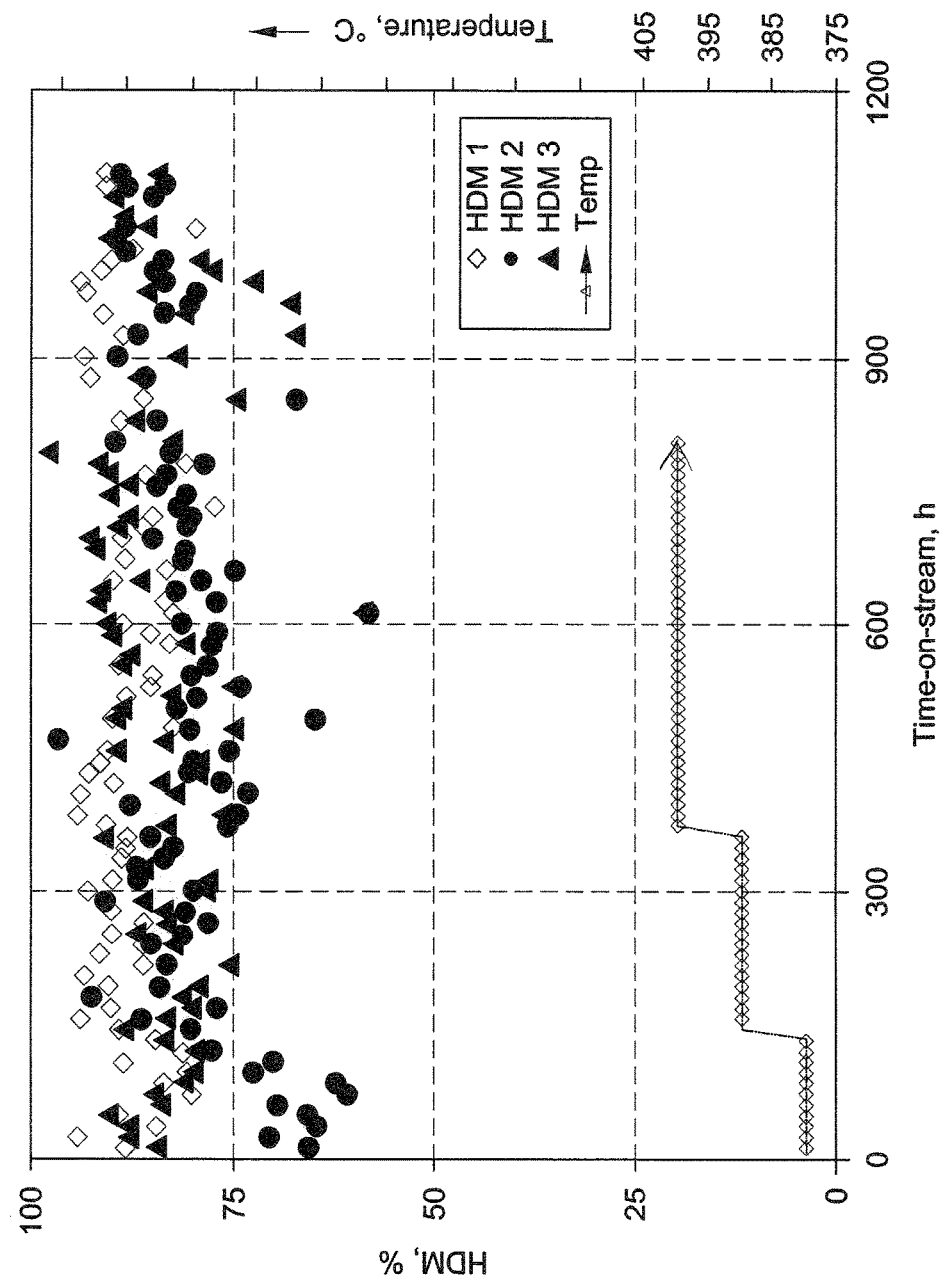
FIG. 6A is a plot of Fe hydrometallization (HDM) activities for selected catalysts.
Figure 6B:
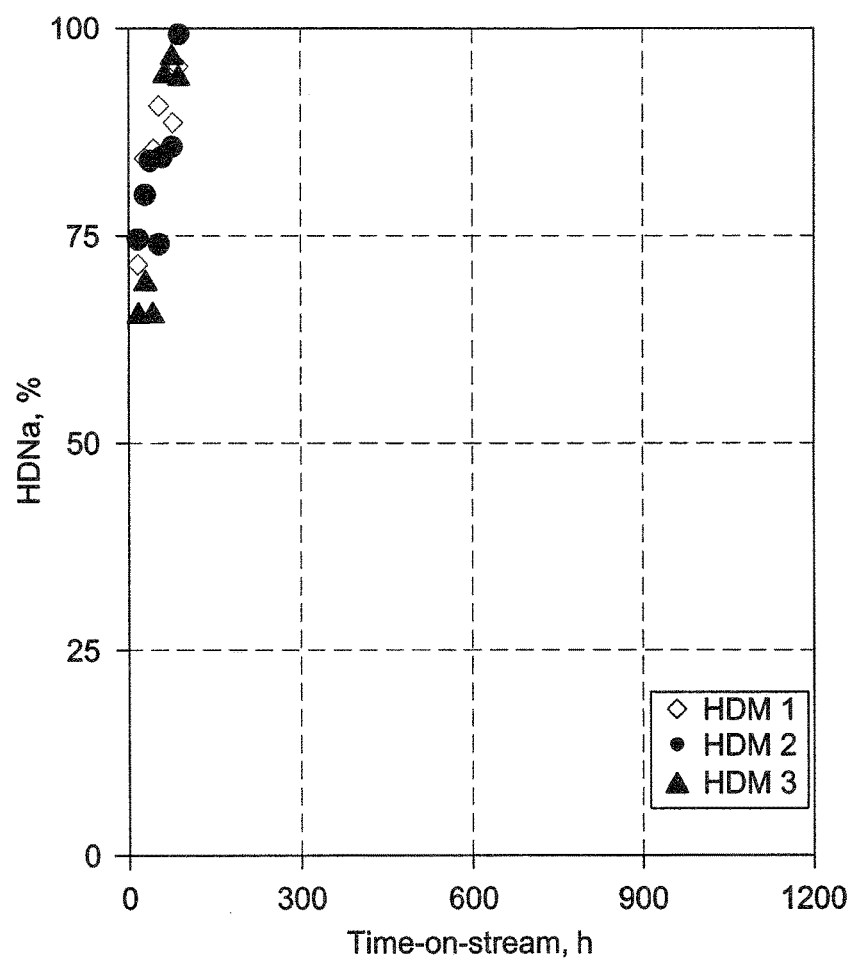
FIG. 6B is a plot of Na hydrodemetallization (HDM) activities for selected catalysts.

In addition to Ni and V, other metals, such as Na and Fe, were also found in the feedstock used in this example, as shown in Table 3. The activities of Fe and Na removals are shown in FIG. 6 for HDM-1, HDM-2, and HDM-3. The three catalysts are very effective in Fe removal, with a conversion of 80% or more. Fe removal is typically associated with some shortcomings as the deposited FeS particles act as dehydrogenation sites at high temperature, which enhance coke formation. However, for catalysts with optimum textural properties (i.e. HDM-1, HDM-2, and HDM-3), the impact of Fe deposition on HDM activity was insignificant as previously shown in the activity reassessment of FIG. 5.

The removal of Na is 100% could be it is in the form of salt, which cannot filter through the catalyst bed. The content of salt further indicated the severity of feedstock, which is the most difficult to process. Usually the metals (Ni and V) are porphyrin-like structure, which are associated with asphaltene molecules.

Example 5

Catalyst Evaluation

Figure 7:
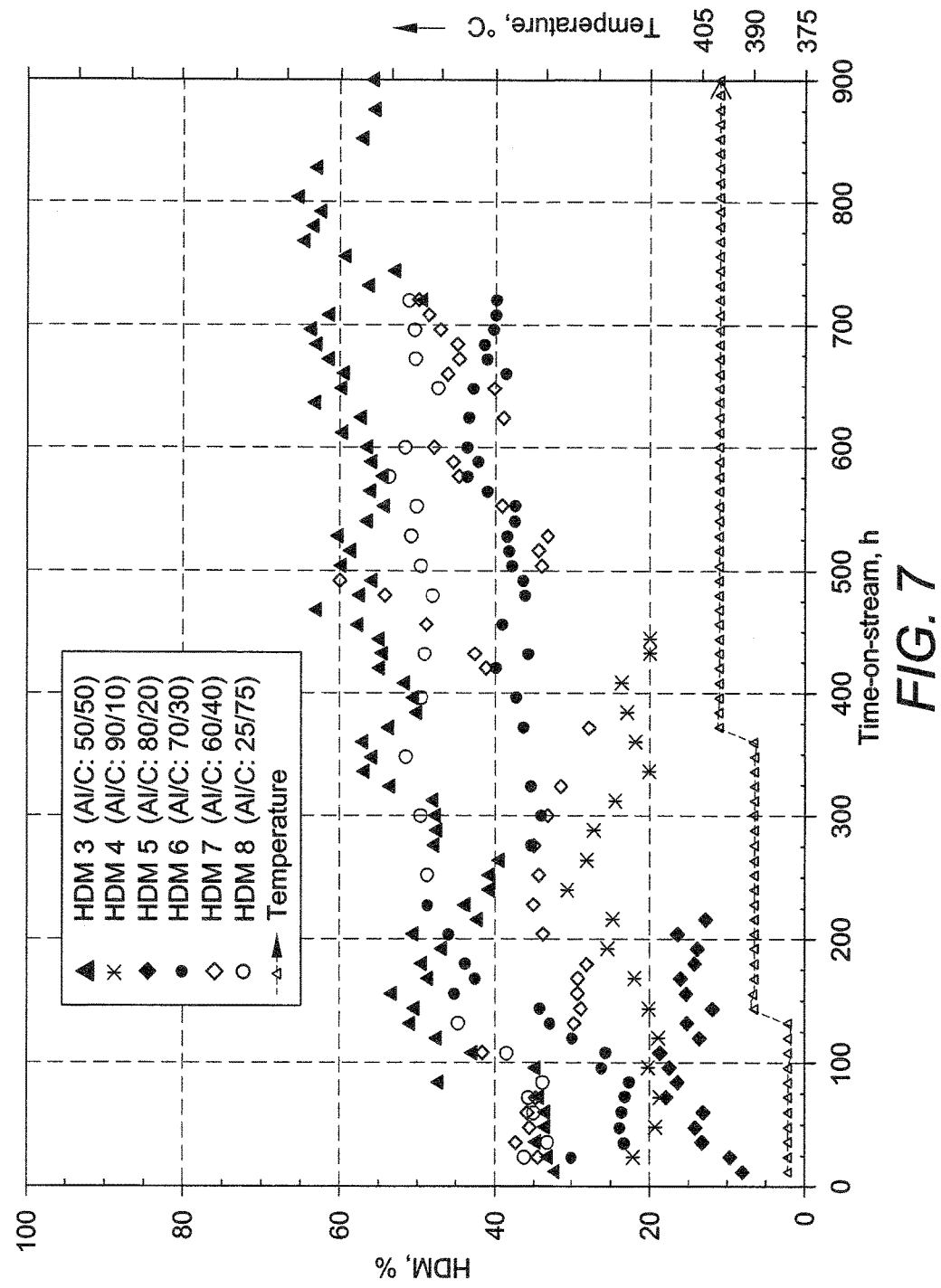
FIG. 7 is a plot showing effect of catalyst textural properties on HDM activity (prototype catalysts of different support compositions (10, 30, 40, 50, 60 and 75 wt. % carbon) but similar active metals (i.e., FeMo), tested with Ku-crude oil at different reaction temperatures).

This embodiment is prepared by similar procedure as stated in Example 4, but with different catalysts. The catalysts considered in this example include HDM-3, HDM-4, HDM-5, HDM-6, HDM-7 and HDM-8, which have different support compositions (i.e., Al/C weight ratios) but similar active metals (i.e., FeMo). The support compositions and the active metal contents of these catalysts are previously indicated in Table 1 and FIG. 2, respectively, while their textural and mechanical properties as are summarized in Table 5. FIG. 7, on the other hand, exemplifies the HDM activities of these catalysts at different temperatures, using Ku crude oil as a feedstock.

The carbon content impacts on catalysts' textural and mechanical properties are exemplified in Table 5. General speaking, the increase in carbon content enhanced the textural properties; however, this carbon content has an optimum value, around 50 wt. %, beyond which both the textural and the mechanical properties are deteriorated. For example, the high carbon content in catalyst HDM-8 (75 wt. %) resulted in a significant decrease in the pore area and the total pore volume. In addition, the high carbon content in the support negatively impacted the pore size distribution, which turned out to be a mono-modal type of pores. The deterioration in textural properties in catalyst HDM-8 was also associated with drop in the mechanical properties (i.e., side crushing strength and bulk density), which are essential for commercial applications.

The impact of catalyst textural properties on HDM activity is illustrated in FIG. 7. The best HDM activity is observed on catalyst HDM-3, followed by HDM-8 and HDM-7, respectively. The worst HDM activities, on the other hand, are noticed in catalysts HDM-5 and HDM-4. Since all catalysts in this example have comparable active phase (Mo promoted by Fe), then the observed differences in HDM activity should be mainly credited to the optimization in textural properties. Taking into consideration the lower bulk densities of catalysts HDM-3 and HDM-8, and bearing in mind that all catalysts were evaluated with fixed volume (i.e., 15 ml), one can realize that the amount of catalysts (weight) used in testing HDM-3 and HDM-8 are comparably less than that used for evaluating the other catalysts. Despite the less amounts of catalysts, HDM-3 and HDM-8 illustrated the best HDM performances. In fact, the same argument can be used when comparing the HDM performances of catalysts HDM-3 and HDM-8, where the lower activity in HDM-8 can be attributed to its lower bulk density (about 34% lower than HDM-3), which resulted in using less weight of HDM-8. The slow progressive decrease in the activity of HDM-8 can be also credited to the catalyst low attrition property, which resulted in considerable loss of catalyst during reaction. The good catalytic stability of HDM-3, on the other hand, is mainly credited to its optimized textural properties, particularly the PSD and the TPV, which respectively control the diffusion of complex hydrocarbon molecules and increase the metal retention capacity. The importance of large pores on catalytic stability can be also observed on the performance of HDM-4, which rapidly deactivated due to pore plugging and diffusion limitation.

TABLE 5

Effect of carbon content on textural and mechanical properties of the supported catalysts

| Sample ID | | Textural properties | | | Pore size distribution (PSD), % | | | Mechanical properties | |
|---|---|---|---|---|---|---|---|---|---|
| Support | Catalyst | Pore area, m²/g | TPV, ml/g | APD, nm | <50 nm | 5-50 nm | >100 nm | SCS, lb/mm | BD, g/ml |
| A | HDM-4 | 242.5 | 0.574 | 9.5 | 59.5 | 34.4 | 6.2 | 5.629 | 0.5902 |
| B | HDM-5 | 220.1 | 0.627 | 11.4 | 47.3 | 42.4 | 10.3 | 4.555 | 0.5180 |
| C | HDM-6 | 215.1 | 0.707 | 13.2 | 41 | 28.6 | 30.4 | 4.156 | 0.4896 |
| D | HDM-7 | 210.2 | 0.904 | 15.8 | 31.1 | 22.3 | 46.5 | 3.658 | 0.4311 |
| E | HDM-3 | 172.1 | 1.044 | 25.4 | 19.9 | 18.7 | 61.4 | 1.523 | 0.3816 |
| F | HDM-8 | 78.0 | 0.827 | 32.8 | 0 | 0 | 100 | 0.571 | 0.2550 |

SCS: side crushing strength; BD: bulk density

Example 6

Impact of Mo Concentration on the HDM Activity

Figure 8:
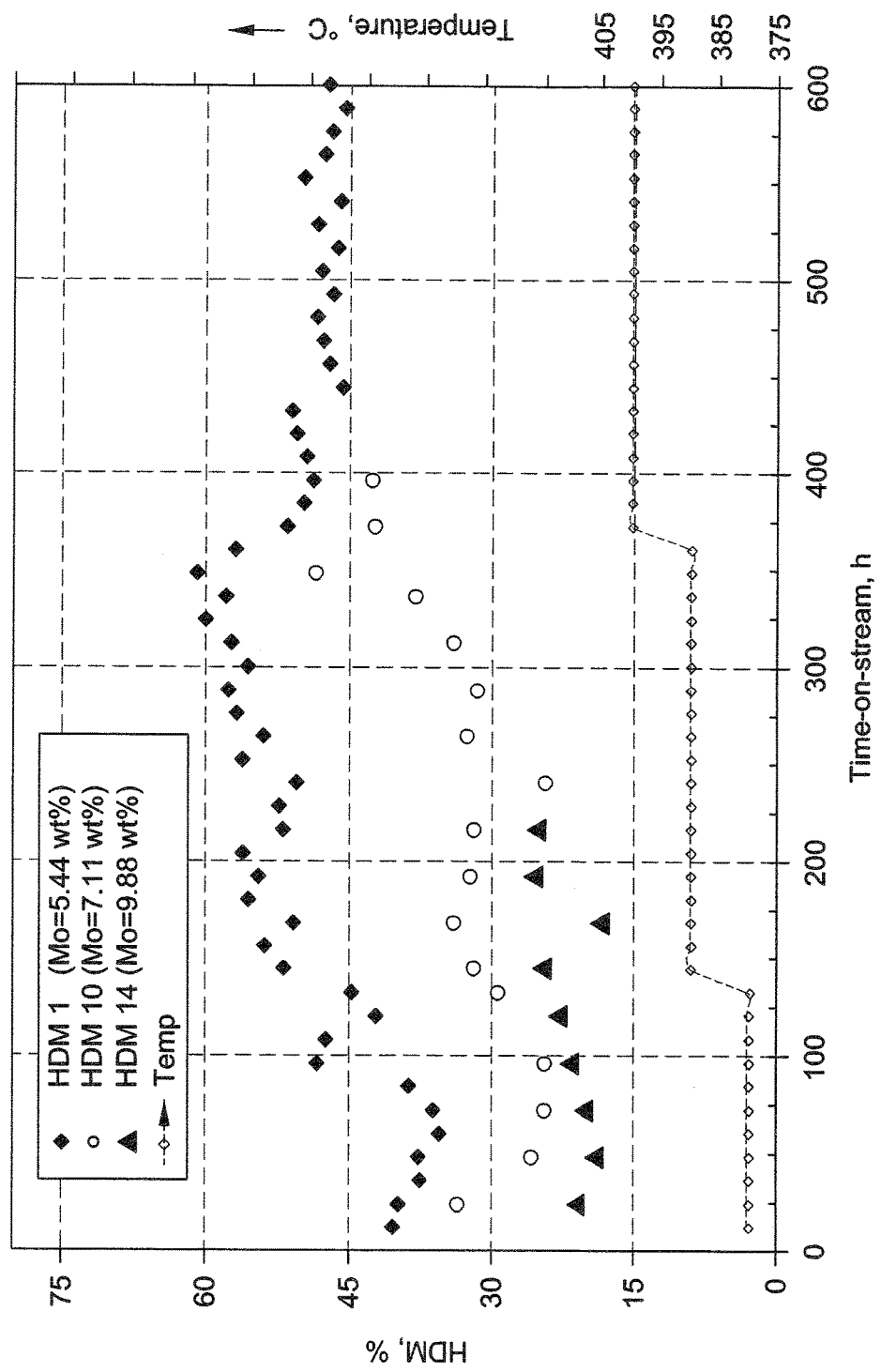
FIG. 8 is a plot showing the effect of Mo content on the HDM activity.

This example mainly evaluates the impact of Mo concentration on the HDM activity. The experimental procedures of this example are similar to the ones followed in examples 4 and 5. The catalysts used in this example are HDM-1, HDM-10, and HDM-14. The three catalysts have similar support composition (i.e., type E) and similar active phase (i.e., CoMo), but different Mo loadings. Table 6 illustrates the active metal loadings in the three catalysts and exemplifies the impact of metal concentrations on the textural properties. The Mo impact on HDM activity is presented in FIG. 8, where the catalyst of lowest Mo content (HDM-1) demonstrated the highest HDM activity while the one with highest Mo loading (HDM-14) was the least active. Thus, the higher amount of Mo has not improved the catalytic activity; instead, it negatively impacted the catalyst textural properties by decreasing the pore area and the total pore volume. The impact of metal loading on textural properties is also complemented by the pore size distribution, where pores of less than 50 nm diameter have considerably decreased. Hence, the results highlighted in this example clearly suggest that the textural properties of a catalyst are equally important to the number of catalytic sites and their dispersion, particularly for heavy crude oil processing.

TABLE 6

Effect of Active Metal Composition on the Textural Properties

| | Metal weight, wt. % | | Textural Properties | | | Pore Size Distribution, % | | |
|---|---|---|---|---|---|---|---|---|
| Sample ID | Mo | Co | Pore area, m²/g | TPV, ml/g | APD, nm | <50 nm | 5-50 nm | >100 nm |
| HDM-1 | 5.55 | 1.09 | 181.2 | 0.948 | 20.9 | 26.0 | 20.8 | 53.2 |
| HDM-10 | 7.11 | 1.84 | 192.4 | 1.110 | 23.1 | 23.0 | 18.4 | 58.6 |
| HDM-14 | 9.88 | 2.5 | 124.0 | 0.888 | 28.6 | 19.6 | 26.0 | 54.5 |

Example 7

Preparation of Catalysts with Chelating Agent, Ethylenediaminetetraacetic Acid (EDTA)

Figure 9:
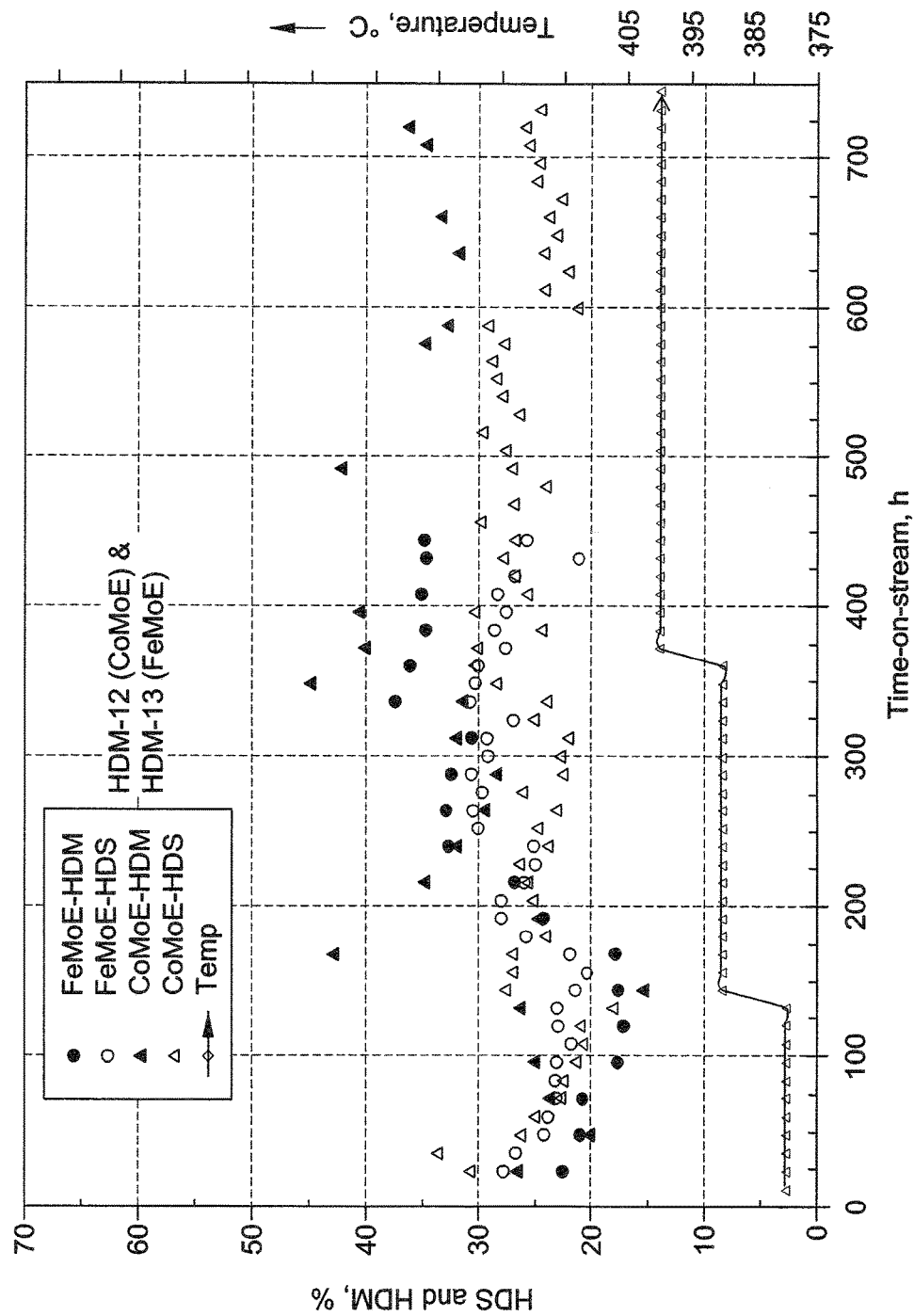
FIG. 9 is a plot showing the HDM and HDS activities of prototype catalysts prepared with chelating agent and tested with Ku-crude oil at different reaction temperatures.

The catalysts presented in this example are prepared by chelating agent, ethylenediaminetetraacetic acid (EDTA), with the aim of improving the dispersions of active metals and promoters and their interactions. The catalysts have been prepared according to incipient wetness co-impregnation method. In this particular case, chelating agent is dissolved into the ammonium hydroxide solution, while Co and Mo salt solution were obtained in distilled water, which were mixed and added together where a clear transparent pink color solution was prepared according to the required pore volume of the support. On the other hand, due to the instability of Fe, Mo and EDTA solution, FeMoEDTA catalyst was prepared in two steps, where Mo was impregnated alone in the first step, and subsequently Fe and EDTA solutions were impregnated. The catalysts with chelating agent, HDM-12 and HDM-13, are prepared by the incipient wetness impregnation method and loaded into the reactor without calcination, as previously indicated in Example 2. The catalyst evaluation procedures (i.e., operating conditions and feedstock) are similar to the ones previously indicated in Examples 4, 5, and 6. The impacts of chelating agent on the textural properties are shown in Table 7. This impact can be further illustrated by comparing HDM-12 (Table 7) to HDM-1 and HDM-10 (Table 6), and comparing HDM-13 to HDM-3 (Table 4). It is evident from these comparisons that the presence of chelating agent impacted the textural properties. Another factor that might contribute to the observed differences in textural properties is the absence of calcination for catalysts prepared with chelating agent (i.e., HDM-12 and HDM-13). The above comparisons indicate that the presence of chelating agent, and/or the absence of calcination, contributed to the observed reduction in the pore area and total pore volume. The pore size distribution was also affected by chelating agent, where a slight reduction is observed in the percentage of small pores (<50 nm), which consequently increased the percentage of larger pores (>100 nm). The impact of chelating agent on the catalytic HDS and HDM activities are shown in FIG. 9. The HDM activities of catalysts HDM-12 and HDM-13 (FIG. 9) can be respectively compared with the activities of catalysts HDM-1 and HDM-10 (FIG. 8) and HDM-3 (FIG. 7), which indicate a notable decrease in the catalytic activity. Since the active phase of these catalysts are fairly comparable, this observed decline in the HDM activity has to be attributed to the observed changes in the textural properties, which again highlight the importance of these properties for the processing of heavy crude oils.

TABLE 7

Impact of Chelating Agent on the Textural
Properties of Supported Catalysts

| Sample ID | Textural Properties | | | Pore size Distribution, % | | |
|---|---|---|---|---|---|---|
| | Pore Area, m²/g | TPV, ml/g | APD, nm | <50 nm | 5-50 nm | >100 nm |
| HDM-12 (CoMoE) | 125.3 | 0.856 | 27.3 | 19 | 18.4 | 62.6 |
| HDM-13 (FeMoE) | 114.9 | 0.88 | 29.7 | 17.5 | 18.1 | 64.4 |

Example 8

Evaluation of Other Activities

Figure 10A:
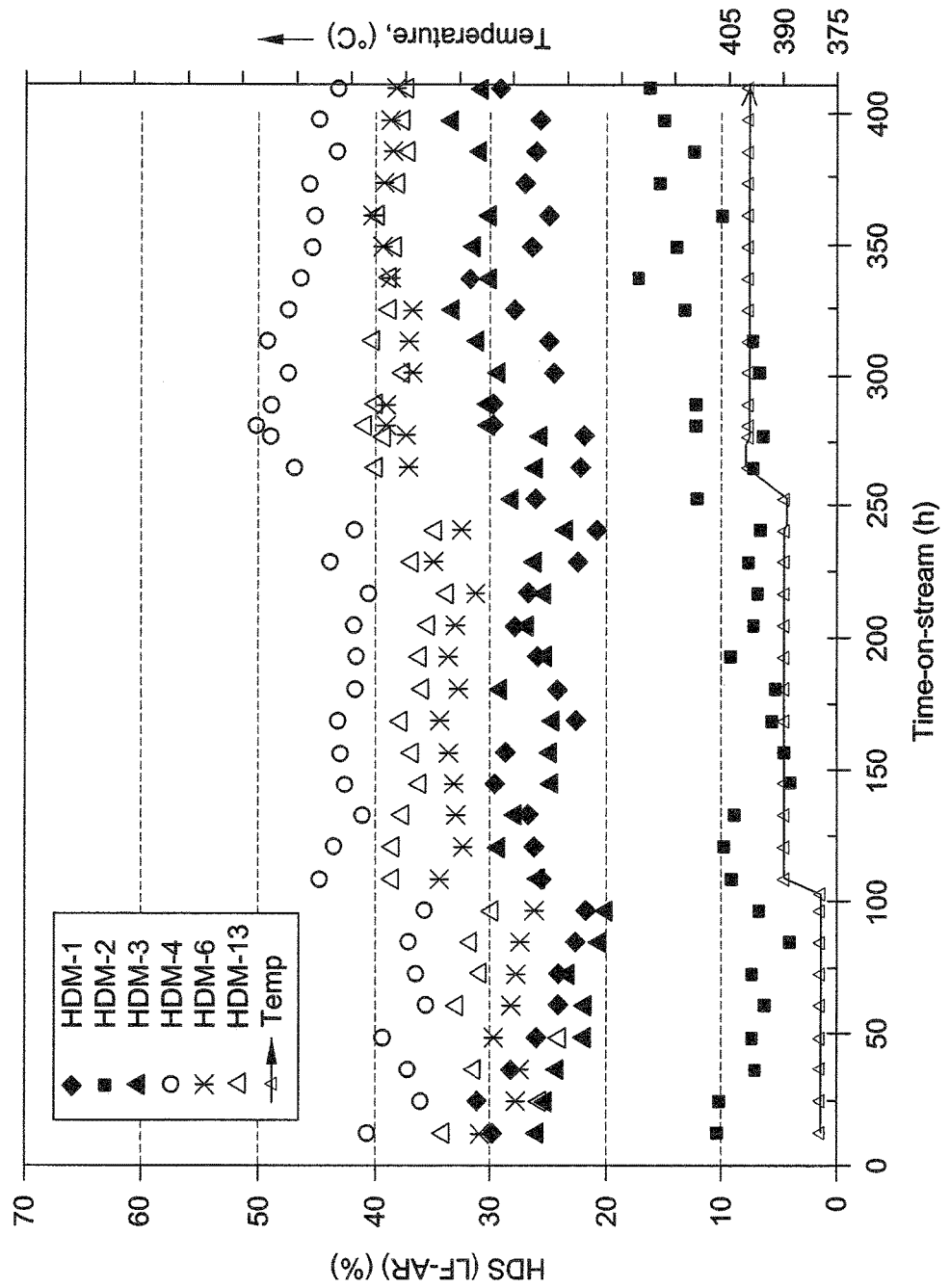
FIG. 10A depicts the hydrodesulphurization activities for selected prototype catalysts for LF-AR.

In addition to the HDM activity evaluation, the HDS activity has been evaluated for all prototype catalysts (HDM-1 to HDM-14). FIG. 10A illustrates the HDS activities of six selected prototype HDM catalysts, tested with LF-AR at three different temperatures (i.e., 380° C., 390° C., and 400° C.). HDM-4 has relatively shown the best HDS activity and the best activity response to the increase in reaction temperature. This can be primarily credited to the high alumina content (90 wt. %) in its support, which results in relatively smaller pores and consequently larger surface area (Table 5), usually needed for HDS reaction. The lowest HDS activity, on the other hand, is observed in the performance of HDM-2, which exemplifies the importance of molybdenum (Mo) in the active phase composition for HDS reaction. The moderate HDS activities of catalysts HDM-1 and HDM-3 are expected due to the relatively small surface area, which usually characterizes effective HDM catalysts. The comparison of HDS performances between HDM-3 and HDM-13 indicates that the addition of EDTA has improved the HDS activity by at least 10% at all operating temperatures, which is mainly attributed to the role of EDTA in improving metal dispersion on support.

FIGS. 10B1 and 10B2, on the other hand, exemplifies the HDS activities of all prototype catalysts when exposed to more difficult feedstock, Ku crude oil, with higher metal and asphaltene contents. In agreement with FIG. 10A, HDM-4 initially illustrates the highest HDS activity, however, this activity rapidly drops after 300 hours, despite the increase in reaction temperature. The rapid deactivation in HDM-4 is mainly due to the high level of impurities in Ku crude oil. The deactivation pattern for HDM-4 clearly suggests that the catalyst has suffered from pore mouth plugging, which is due to the small pores that are usually found in alumina support. The HDS activity of HDM-3, on the other hand, responded splendidly to the increase in reaction temperature. HDM-1 also illustrated similar trend to HDM-3, but with slightly lower HDS activity, which are mainly due to the role of promotor; Fe promotor to Mo in HDM-3 is more effective than the Co promotor to Mo in HDM-1. In agreement with FIG. 10A, HDM-2 illustrated the worst HDS performance compare to the rest of prototype catalysts. This is mainly attributed to the absence of Mo from the composition of the active phase. The impact of promotor is also evident in HDM-11, where Ni that is known for its good hydrogenation function contributed positively to the initial activity. However, the activity response to the increase in temperature was limited in this catalyst. Catalyst HDM-8, which has an active phase of FeMo and high carbon content in support (i.e., 75 wt. % carbon and 25 wt. % alumina), also illustrated stable but moderate HDS activity. The moderate activity in HDM-8 is mainly attributed to its low bulk density, which resulted in using almost half the weight of other catalysts (catalysts were evaluated with fixed volume; 15 ml).

The catalyst HDM activity is expected to be closely associated with the hydrodeasphaltenization (HDAs) and the hydrodemicroresidue (HDMCR) activities, because all of them corresponds the conversion of complex hydrocarbon molecules. In spite of their similar reaction selectivity, it is important to indicate that HDAs is mainly related to asphaltene molecule conversion while the HDMCR is more indicative of coke precursor and the H/C ratio in the product. FIGS. 10C1, 10C2, 10D1, and 10D2, respectively show the HDAs and HDMCR activities for all prototype catalysts while processing with Ku crude oil. The HDAs is more responsive to temperature increase due to the additional impact of thermal conversion on asphaltene molecules.

Example 9

Metal Retention Capacity

The metal retention capacity is based on the fresh catalyst textural properties are addressed in this example. The front-end HDM catalysts in residue hydroprocessing mainly deactivate through two mechanisms; active site poisoning and pore-mouth plugging. The observed deactivation on the three catalysts, after operating for more than 1000 h, can be mainly attributed to metal retention capacity. During the hydrodemetallization of heavy crude oil and residue the conversion leave metal sulfide (as a solid) on the catalyst surface as solid, which deactivate catalytic sites and deposit on the pores mouth, which is expected to generate diffusion limitation at initial stage of run while with time block the pores and decrease the textural properties. Thus, heavy oil processing catalysts are deactivated either through site coverage and/or pore-mouth plugging. The deactivation by pore-mouth plugging can be evaluated through comparing the textural properties of fresh (Table 4) and spent catalysts by seeing the changes in textural properties as reported in Table 8.

TABLE 8

Textural Properties of Spent Catalysts

| Sample ID | Textural properties | | | Pore size distribution, % | | |
|---|---|---|---|---|---|---|
| | Pore area, m²/g | TPV, ml/g | APD, nm | <50 nm | 5-50 nm | >100 nm |
| S-HDM-1 (CoMo) | 43 | 0.329 | 6.8 | 0.76 | 24.9 | 74.4 |
| S-HDM-2 (CoFe) | 37 | 0.243 | 5.6 | 2.57 | 27.6 | 69.8 |
| S-HDM-3 (FeMo) | 50 | 0.31 | 6.9 | 1.07 | 26.1 | 72.9 |

Figure 11:
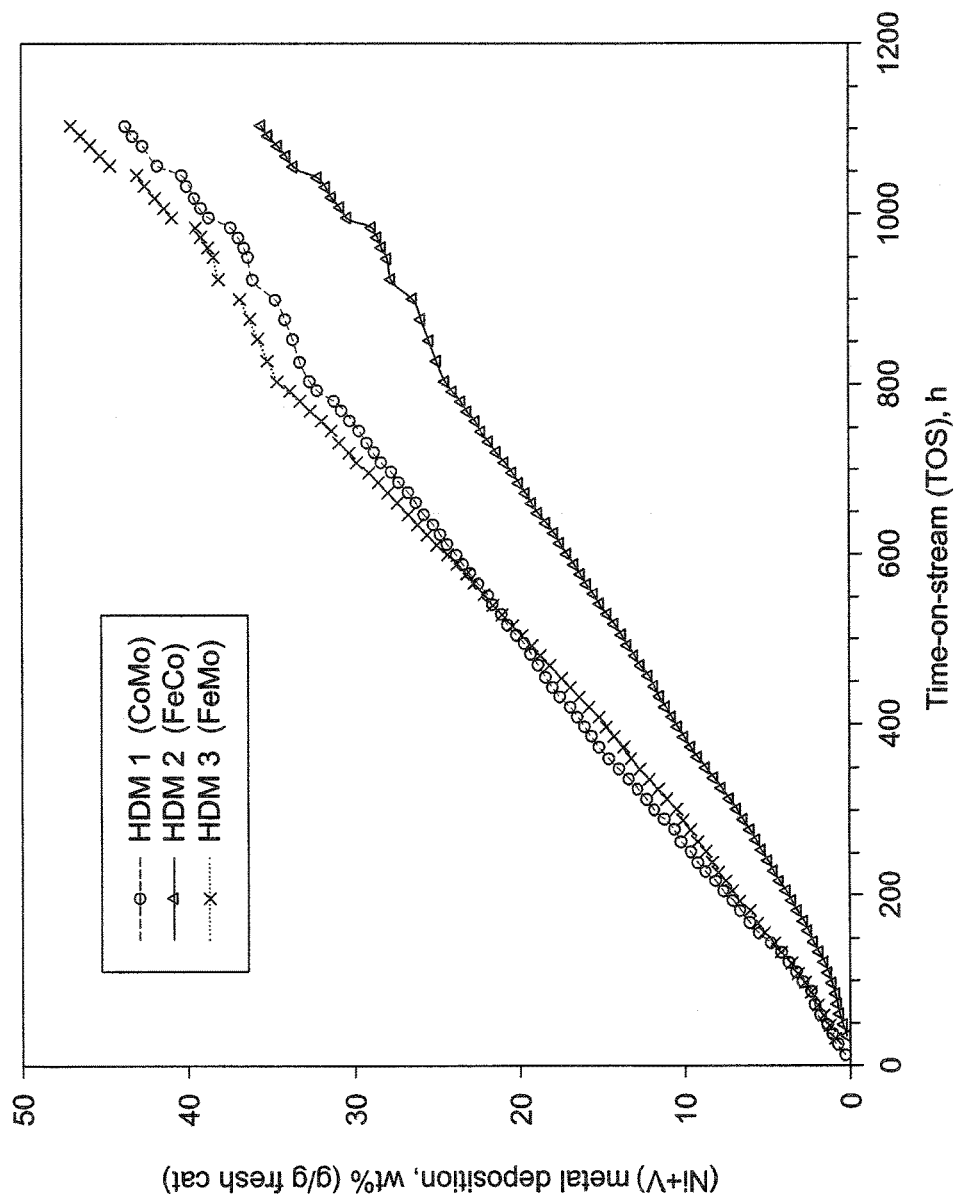
FIG. 11 shows the plot of the metal deposition (Metal-on-catalysts (MOC)) for selected spent catalysts as a function time-on-stream (TOS).

The results suggest that there is an optimal combination for textural properties (i.e. pore area, pore volume, and pore diameter) that result in high HDM activity. Metal deposition (Ni, V, Fe, and Na) on the other hand, occurs in the form of metal sulfides. FIG. 11 illustrates the metal deposition for three catalysts using Ku crude oil as a feedstock. The reported metal deposition was measured based on the HDM conversions considering that metal will deposit on the catalyst surface as metal sulfides. Therefore, metal deposition against time-on-stream is another way of expressing the HDM activity. The plots in FIG. 11 clearly indicate that HDM-1 and HDM-3 have the best HDM activities while the HDM-2 has lower conversion as well moderate metal deposition.

Therefore, the above examples illustrate that the inventive alumina supported catalysts can be synthesized by impregnating the support extrudates with the hydrogenation active metals and promoter metals. The compositions of the supports (0-75% activated carbon in alumina), the stepwise drying, and the calcination under moderate flow of air in a rotating furnace produced supports with large pore volume, respectively enhances the metal storage capacity and minimizes diffusion limitations of large hydrocarbon molecules (i.e., asphaltene). The presence of carbon in the support also helps in reducing coke and metal depositions on pore-mouth and catalytic sites. The optimum textural and mechanical properties of the support are obtained when the carbon-alumina weight ratio is 1:1. The synthesized catalysts comprises meso-macro-pores encompassing bimodal-type pore structure having textural properties such as an average pore diameter of 5-1000 nm, total pore volume of 0.3-1.5 ml/g, and moderate surface area of 50-200 $m^2/g$. Thus, the inventive catalysts can be used in the first reactor, for hydroprocessing petroleum feedstock of high metal and asphaltene contents.

It is to be understood that the present invention is not limited to the embodiments described above, but encompasses any and all embodiments within the scope of the following claims.

We claim:

1. A hydrodemetallization catalyst, comprising:

a catalyst support having a weight ratio of 1:1 alumina to carbon, the support having a first plurality of pores and a second plurality of pores, the first plurality of pores having an average diameter smaller than an average diameter of the second plurality of pores, wherein the first plurality of pores have an average diameter of about 8 nm, and the second plurality of pores have an average diameter greater than about 100 nm;

at least one hydrogenation active metal and at least one promoter metal impregnated on the catalyst support, wherein the hydrogenation active metal includes at least one of Mo, W, and Fe, and the promoter metal includes at least one of Co, Ni and Fe; and the catalyst has a total pore volume ranging from about 0.5 ml/g to about 1.1 ml/g and a pore surface area ranging from about 110 $m^2/g$ to about 250 $m^2/g$.

2. The hydrodemetallization catalyst according to claim 1, further comprising ethylene diamine tetra acetic acid (EDTA).

3. The hydrodemetallization catalyst according to claim 1, wherein the catalyst has a high metal retention capacity of about 40 weight % to about 50 weight %.

* * * * *